United States Patent [19]
Baker et al.

[11] Patent Number: 5,273,572
[45] Date of Patent: Dec. 28, 1993

[54] PROCESS FOR REMOVING AN ORGANIC COMPOUND FROM WATER

[75] Inventors: Richard W. Baker; Jürgen Kaschemekat, both of Palo Alto; Johannes G. Wijmans, Menlo Park; Henky D. Kamaruddin, San Francisco, all of Calif.

[73] Assignee: Membrane Technology and Research, Inc., Menlo Park, Calif.

[21] Appl. No.: 890,931

[22] Filed: May 29, 1992

[51] Int. Cl.[5] ............................................. B01D 53/22
[52] U.S. Cl. ........................................ 95/48; 95/50; 95/254; 95/265; 96/4; 96/202
[58] Field of Search .................. 55/16, 46, 47, 51, 53, 55/54, 158, 189, 196, 198

[56] References Cited

U.S. PATENT DOCUMENTS

| | | | |
|---|---|---|---|
| 4,444,571 | 4/1984 | Matson | 55/54 X |
| 4,517,094 | 5/1985 | Beall | 210/664 |
| 4,553,983 | 11/1985 | Baker | 55/16 |
| 4,713,089 | 12/1987 | Robbins | 55/198 X |
| 4,737,283 | 4/1988 | Gresch | 55/189 X |
| 4,772,295 | 9/1988 | Kato et al. | 55/16 |
| 4,793,841 | 12/1988 | Burr | 55/16 X |
| 4,857,198 | 8/1989 | Meidl | 210/603 |
| 4,892,564 | 1/1990 | Cooley | 55/158 X |
| 4,892,664 | 1/1990 | Miller | 210/747 |
| 4,906,256 | 3/1990 | Baker et al. | 55/16 |
| 4,979,886 | 12/1990 | Rippberger | 55/196 X |
| 5,032,148 | 7/1991 | Baker et al. | 55/16 |
| 5,051,113 | 9/1991 | Nemser | 55/158 X |
| 5,051,114 | 9/1991 | Nemser et al. | 55/158 X |
| 5,053,059 | 10/1991 | Nemser | 55/158 X |
| 5,069,686 | 12/1991 | Baker et al. | 55/16 |
| 5,071,451 | 12/1991 | Wijmans | 55/16 |
| 5,089,033 | 2/1992 | Wijmans | 55/16 |
| 5,102,432 | 4/1992 | Prasad | 55/158 X |
| 5,122,165 | 6/1992 | Wang et al. | 55/196 X |
| 5,122,166 | 6/1992 | Hyrcyk et al. | 55/196 X |
| 5,129,924 | 7/1992 | Baker et al. | 55/158 X |
| 5,147,417 | 9/1992 | Nemser | 55/158 X |

Primary Examiner—Robert Spitzer
Attorney, Agent, or Firm—J. Farrant

[57] ABSTRACT

A process for removing organic compounds from water is disclosed. The process involves gas stripping followed by membrane separation treatment of the stripping gas. The stripping step can be carried out using one or multiple gas strippers and using air or any other gas as stripping gas. The membrane separation step can be carried out using a single-stage membrane unit or a multistage unit. Apparatus for carrying out the process is also disclosed. The process is particularly suited for treatment of contaminated groundwater or industrial wastewater.

102 Claims, 19 Drawing Sheets

PROCESS FOR REMOVING AN ORGANIC COMPOUND FROM WATER

This invention was made with support form the U.S. Government under Contract Number 02112404 from the Department of Energy. The Government has certain rights in this invention.

FIELD OF THE INVENTION

This invention relates to a process for removing an organic compound from water. More particularly, the invention relates to a gas-stripping process, adapted so that the exhaust gas from the stripper can be treated by a membrane separation process to remove organic compound.

BACKGROUND OF THE INVENTION

Stripping is a process used to remove volatile compounds from water. The basic concept is to bring the contaminated water into intimate contact with a stripping gas, frequently air, so that the volatile compounds undergo a phase change from liquid to vapor and are carried away by the stripping gas. A number of interrelated design factors affect the stripping efficiency: the Henry's law coefficient, the stripping gas:water volume flow ratio, the contact time and the mass transfer rate. The gas:water volume ratio used to remove organic compounds from water depents on the volatility of the compound to be removed, its concentration in the feed water and the physical attributes under which the contact is carried out. It is typically in the range 50:1–500:1 or more. The organic compound is, therefore, diluted by this amount when it is transferred from the water to the gas. When other factors are constant, a high gas:water volume ratio provides a high percentage of organic compound removal from the water, but creates large volumes of gas contaminated with dilute concentrations of organic compound. A low gas:water volume ratio may provide insufficient dilution of the organic compound in the gas to maintain a good driving force for mass transfer. Under optimum conditions, transfer of the organic compound from the water to the gas can be very efficient and removal rates up to 99.99% can be achieved.

The principal disadvantage of gas stripping is the air pollution that is caused when the waste gas is discharged. Various treatments have been proposed for this exhaust stripping gas. U.S. Pat. No. 4,892,664 described an air-stripping system followed by catalytic oxidation of the contaminated air. U.S. Pat. No. 4,857,198 describes air-stripping in combination with a mixed carbon adsorption/biological treatment for the waste air. U.S. Pat. No. 4,517,094 also briefly mentions combinations of air stripping and carbon adsorption.

That membranes have the capability to separate organic or inorganic vapors from other gases is known. For example, U.S. Pat. No. 5,032,148 describes a membrane fractionation process used to divide a gas stream containing organic vapor into a dilute stream containing less than 0.5% vapor and a concentrated stream containing more than 20% the saturation concentration of the organic compound. U.S. Pat. No. 4,906,256 describes the separation of fluorinated hydrocarbon vapors from other gases by means of membranes. U.S. Pat. No. 4,553,983 describes a basic process for recovering organic vapors from air.

SUMMARY OF THE INVENTION

The invention is an improved gas-stripping process, involving a combination of a gas-stripping operation followed by a membrane separation operation to treat the exhaust gas from the stripper. It has been found possible to combine gas stripping and membrane separation so as to maintain adequate water treatment and simultaneously reduce or eliminate discharge of organic-contaminated gas.

The process of the invention has several aspects. In one aspect, the membrane separation step is used to regenerate the stripping gas, which is fed back to the gas inlet of the stripper. It has been found that adequate stripping can be achieved, even though the recirculated gas contains small amounts of organic compound. If desired, the combined system can operate in an essentially closed loop, so that no waste gas is vented to the atmosphere, thereby eliminating air pollution. Because gas is reused, it is economically practical to use nitrogen, methane or another gas of choice in the stripping step.

In another aspect, the invention matches the operating constraints of the gas-stripping unit and the membrane unit. The stripping operation is carried out with a lower than normal gas:water volume ratio. This decreases the performance of the stripping unit, but produces a smaller-volume, higher-concentration exhaust gas, amenable to efficient treatment by membrane separation. Such a design may be appropriate where a trade-off between slightly lower water quality and reduced air pollution is indicated.

In another aspect, the invention simultaneously achieves high degrees of water purification and high degrees of organic removal from the stripper exhaust gas. In these embodiments, the stripping operation is split into two parts. The first stripping operation is designed to produce an exhaust gas that can be treated to achieve a high degree of organic compound removal by membrane separation. The second stripping operation is designed to achieve a high degree of removal of the remaining organic compound from the water. A different type of separation technique can be substituted for the second stripping operation.

In another aspect, the invention involves operating the gas-stripping step under reduced pressure. This reduces the volume and increases the concentration of the exhaust gas fed to the membrane separation step.

The gas stripper can be of any type that enables the organic-compound laden gas to be confined and passed to the membrane unit for treatment. A packed tower type of stripper is preferred.

The membrane separation process may be configured in many possible ways, and may include a single membrane stage or an array of two or more units that permit multiple treatments of the permeate and/or residue streams from the first unit.

The driving force for permeation across the membrane is the pressure difference between the feed and permeate sides. The pressure drop may be achieved by drawing a vacuum on the permeate side of the membrane, by pressurizing the feed, or both.

The invention is particularly useful for treating groundwater or industrial waste water contaminated with organic compounds. The invention is applicable to any organic compound that has some solubility in water, particularly hydrocarbons and chlorinated hydrocarbons.

It is an object of the invention to provide a gas-stripping process in which emissions of organic compounds to the atmosphere are eliminated or minimized.

It is an object of the invention to provide an improved method of treating water contaminated with organic compounds.

Other objects and advantages of the invention will be apparent from the description of the invention to those of ordinary skill in the art.

It is to be understood that the above summary and the following detailed description are intended to explain and illustrate the invention without restricting its scope.

DETAILED DESCRIPTION OF THE INVENTION

Figure 1:
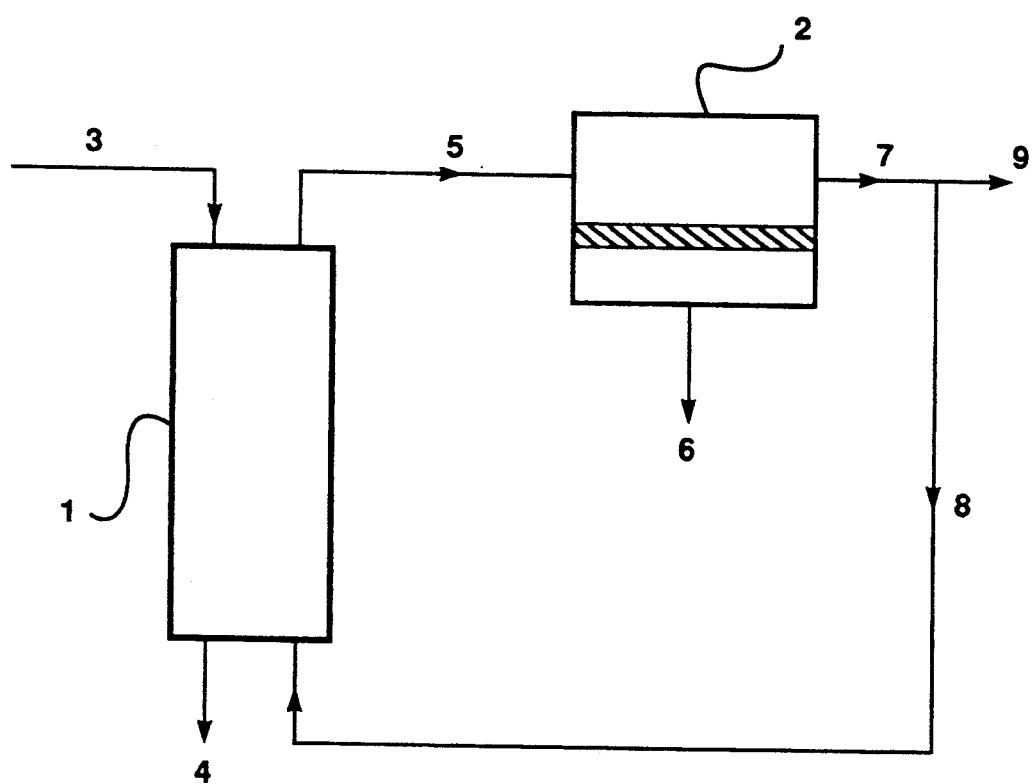
FIG. 1 is a schematic showing an embodiment of the invention in which all or part of the treated gas from the membrane separation unit is returned to the stripper.

The invention concerns processes and apparatus involving a combination of a gas-stripping operation followed by a membrane separation operation to treat the exhaust gas from the stripper. Gas stripping is usually used to treat water streams contaminated with low concentrations of organic compounds, below 100 ppmw and often as low as a few ppmw or in the ppbw range. The invention is useful in the treatment of such streams. It has been found, however, that water containing relatively high concentrations of organic compounds, certainly above 100 ppmw and up to 500 ppmw or much higher can be treated by following the teachings of the invention.

The gas stripper can be of any type, and of any flow configuration, that enables the organic-compound laden gas to be confined and passed to the membrane unit for treatment. Tower strippers are preferred, including spray towers, trayed towers and packed towers. In a spray tower, the water is broken into fine droplets by pumping it through nozzles. Air is passed up through the tower, normally countercurrent to the descending spray. In a trayed tower, air is bubbled through water in a series of aeration trays. In a packed tower, a packing medium is used to maximize the gas/water contact surfaces. Packed towers are the most preferred tower type. The most preferred operating configuration is countercurrent, in which water passes from top to bottom of the tower and gas passes from bottom to top. Other configurations, for example, crossflow, in which water passes from top to bottom and air flows in at the sides, to the center and then out at the top, may also be used.

The stripping gas may be delivered by a forced draft blower or pump on the inlet side or by an induced draft system on the outlet side.

The membrane unit contains a membrane that exhibits a substantially different permeability for the organic compound than for the stripping gas. It may be relatively permeable to the organic compound but relatively impermeable to the stripping gas or relatively permeable to the stripping gas but relatively impermeable to the organic compound. The membrane may take the form of a homogeneous membrane, a membrane incorporating a gel or liquid layer or particulates, or any other form known in the art.

Rubbery polymers are useful for making organic-selective membranes. Preferred embodiments incorporating rubbery selective materials involve the use of a composite membrane comprising a microporous support, onto which the rubbery selective layer is deposited as an ultrathin coating. The preparation of such membranes is well known in the membrane-making art.

Preferred polymers for use as stripping-gas-selective membranes include conventional glassy membrane materials such as polysulfones, polyimides, polyamides, polyphenylene oxide, polycarbonates, ethylcellulose or cellulose acetate. Preferred embodiments of this type use asymmetric membranes in which the thin, dense skin serves as the selective layer. The selective layer may be overcoated with a protective or sealing layer. Such membranes are also well known.

Stripping-gas-selective membranes may also be made from the newer membrane materials, such as substituted polyacetylenes, particularly polytrimethylsilylpropyne (PTMSP) or perfluorodioxole polymers, particularly polymers of perfluorodimethyldioxoles.

Whatever their composition and structure, the membranes should preferably have a selectivity for the faster permeating component over the other component of at least 5, more preferably at least 10 and most preferably at least 20.

The form in which the membranes are used in the invention is not critical. They may be used, for example, as flat sheets or discs, coated hollow fibers, or spiral-wound modules, all forms that are known in the art. Spiral-wound modules are the most preferred choice.

The flux of a gas or vapor through a polymer membrane is proportional to the pressure difference of that gas or vapor across the membrane. To achieve high fluxes of the permeating components, it is desirable not only to make the permselective membrane thin, but also to operate the system with a substantial pressure drop across the membrane. This pressure drop can be achieved by drawing a vacuum on the permeate side of the membrane, by pressurizing the feed, or both.

In designing processes and apparatus that combine gas stripping with membrane separation, the operating constraints of the gas stripper and the membrane unit must be considered. In gas stripping, the ratio of volume flow of gas to volume flow of water is important. If other factors are constant, to obtain a high level of organic compound removal from the feed water this ratio should be such that the concentration of organic compound in the liquid, in equilibrium with the concentration of organic compound in the gas phase, approaches zero. This frequently means that the gas:water volume ratio is high, such as 50:1, 100:1 or higher, and the concentration of the organic compound in the gas phase is very low. Thus, a gas stripper normally achieves high performance by using large volumes of stripping gas and creating a high-volume, low-concentration exhaust.

Turning now to the membrane system, a number of factors affect the design and performance of the membrane unit. An important design consideration is the membrane feed gas flow rate. Upon this flow rate depend the membrane area required and the flow capacities of ancillary equipment, such as filters, pumps, condensers, etc. Thus, a lower feed gas flow rate enables a smaller membrane area and smaller pumps to be used. The capital and operating costs of the membrane unit are correspondingly reduced.

Important parameters that affect the performance of the membrane system include the selectivity, the feed:-permeate pressure ratio, the stage cut (total permeate flow/total feed flow) and the feed concentration. A single-stage membrane separation unit is typically able to remove 80–90% of the organic vapor from the feed gas to produce an organic-enriched stream that has at least 5–10 times the concentration of the feed gas. The enriched stream is usually, but not necessarily, condensed to recover the organic compound in liquid form. If other factors are constant, the more dilute the feed stream, the more dilute is the enriched stream and the more difficult it becomes to recover the organic compound. Thus, membrane separation is favored for feed streams that are characterized by low volume and high concentration compared with gas-stripper exhaust streams.

These operating constraints appear to render combinations of gas stripping and membrane separation unattractive, since the gas stripper and the membrane separation unit work best under conditions that are mutually contradictory; high volume, low-concentration for the stripping gas and low-volume, high concentration for the membrane feed gas. Nevertheless, we have found that it is possible to combine gas stripping with membrane gas separation in a number of useful ways.

Some representative descriptions of the best mode of carrying out the invention in its various aspects are described below. These embodiments are illustrative of workable configurations, but are not intended to limit the scope of the invention in any way. Those of skill in the art will appreciate that the embodiments described could be modified or combined and that many other embodiments in accordance with the invention are possible.

In all the embodiments described below, it is preferred that the overall treatment operation achieves at least about 60% removal of the organic compound from the water and most preferably it should achieve at least about 90% removal.

1. Regeneration and Reuse of Stripping Gas

An embodiment of the invention in which the stripping gas is regenerated and reused is shown in FIG. 1. Referring now to this figure, gas stripper 1 is used to remove an organic compound from water stream 3. The stripping gas enters the stripper as stream 8 and exits as stream 5, which is laden with organic compound. The treated water stream exits the stripper as stream 4. Gas stream 5 passes to membrane separation unit 2. The organic compound passes preferentially through the membrane and emerges as permeate stream 6. The treated gas stream, depleted of the organic compound, exits the membrane separation unit as stream 7. Stream 7 may be completely returned to the stripper for reuse, or may be partially reused and partially discharged. Stream 8 represents the portion of the treated gas stream that is reused in the stripper; stream 9 is the discharge stream.

The figure is a schematic showing the process concept. The apparatus used to carry out the process will, of course, include other components. For example, a pump or blower would normally be used between the membrane outlet and the stripper inlet to circulate the gas through the stripper. The pump or blower may be placed near the stripper inlet or elsewhere as convenient. Alternatively or additionally, a pump positioned in the gas outlet line from the stripper can be used to draw gas through the stripper. A filter may be installed upstream of the stripper or the membrane unit to remove particulates, oil or other contaminants from the water or gas streams entering the stripper or membrane unit. A compressor may be installed upstream of the membrane unit to raise the pressure of the membrane unit feed gas and thereby provide a transmembrane driving force. Alternatively or additionally, a vacuum pump may be connected to the permeate side of the membrane unit to lower the permeate pressure and thereby provide or enhance the transmembrane driving force. If only a portion of the regenerated gas is reused, fresh stripping gas must be added at each pass through the stripper. This might be the case, for example, if nitrogen is used to provide an inert stripping atmosphere. If oxygen leaks into the system, partial discharge of the treated stream may be used to keep the oxygen content of the stripping gas to a level safely below the lower explosion limit and the stripping gas may be topped up with fresh, high-purity nitrogen.

Partial discharge might also be appropriate if there are dischargeable components stripped from the water that are not well removed by the membrane unit.

FIG. 1 shows the membrane separation operation as a single-stage operation. If the permeate from the first stage is too dilute for recovery or further treatment, a multistage membrane system, in which the permeate from one stage becomes the feed to the next, can be used. Because the exhaust gas from the stripper is dilute, two or three membrane stages may be required to achieve sufficient concentration of the permeate.

Figure 5:
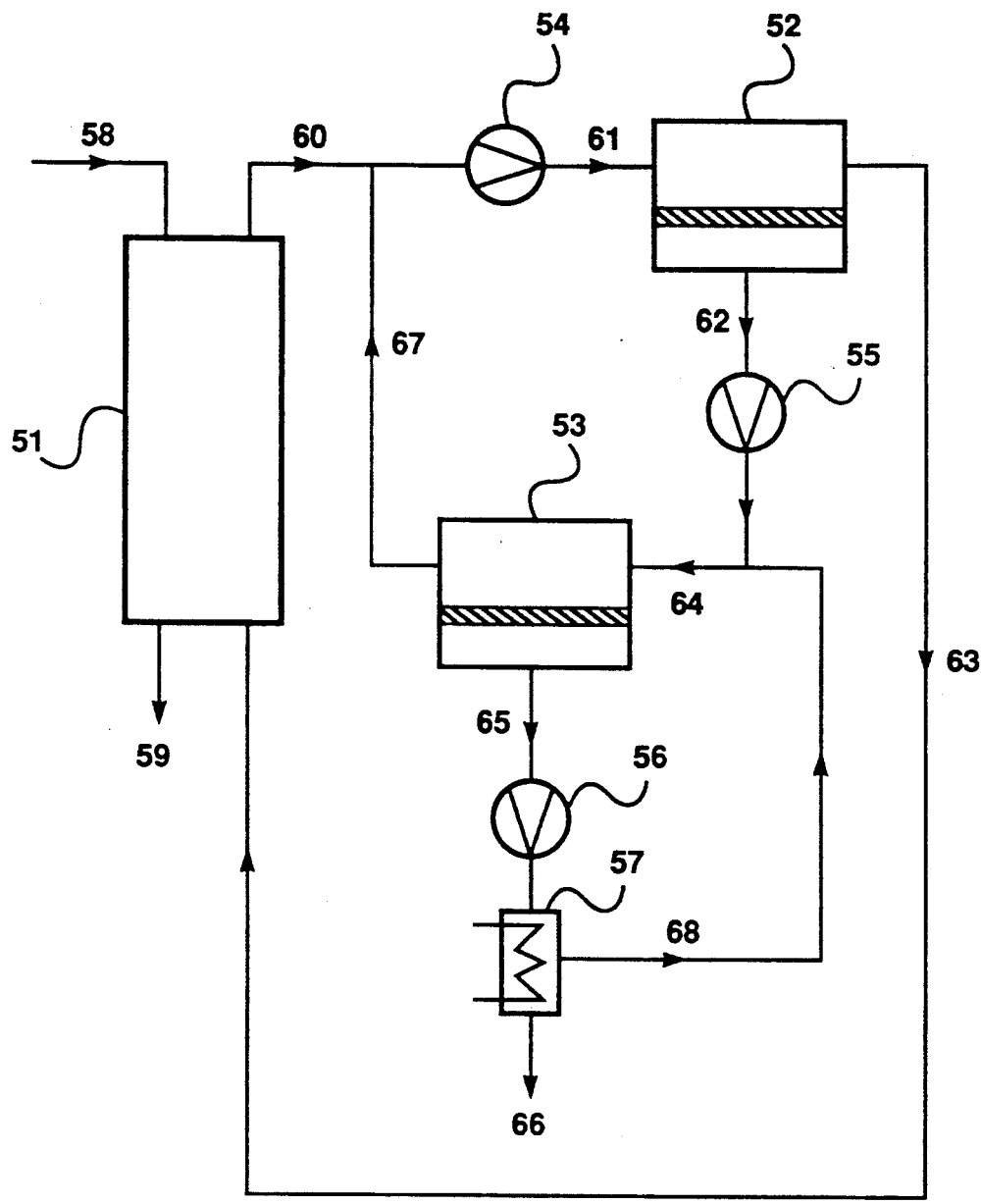
FIG. 5 is a schematic showing an embodiment of the invention using a two-stage membrane separation unit and recovering the organic compound by condensation.

An example of a two-stage system is shown in FIG. 5. Referring now to this figure, gas stripper 51 is used to remove an organic compound from water stream 58. The stripping gas enters the stripper as stream 63 and exits as stream 60, which is laden with organic compound. The treated water stream exits the stripper as stream 59. Gas stream 60 is compressed by compressor 54 and passes as compressed gas stream 61 to membrane separation unit 52. A vacuum pump 55 in the permeate line increases the driving force for membrane permeation. The treated gas stream 63, depleted of organic compound, is returned to the gas stripper inlet. The organic compound passes preferentially through the membrane and emerges as permeate stream 62. Permeate stream 62 is too dilute for organic compound recovery by condensation and is passed to a second membrane stage 53 for further treatment. A second vacuum pump 56 in the permeate line provides a driving force for membrane permeation. The second residue stream 67 from this stage is returned on the upstream side of the first membrane stage. Permeate stream 65 is passed to condenser 57. Organic compound is recovered as liquid stream 66. Noncondensed gas 68 from the condensation step is mixed with first permeate stream 62 to form the feed 64 to the second membrane stage.

Figure 6:
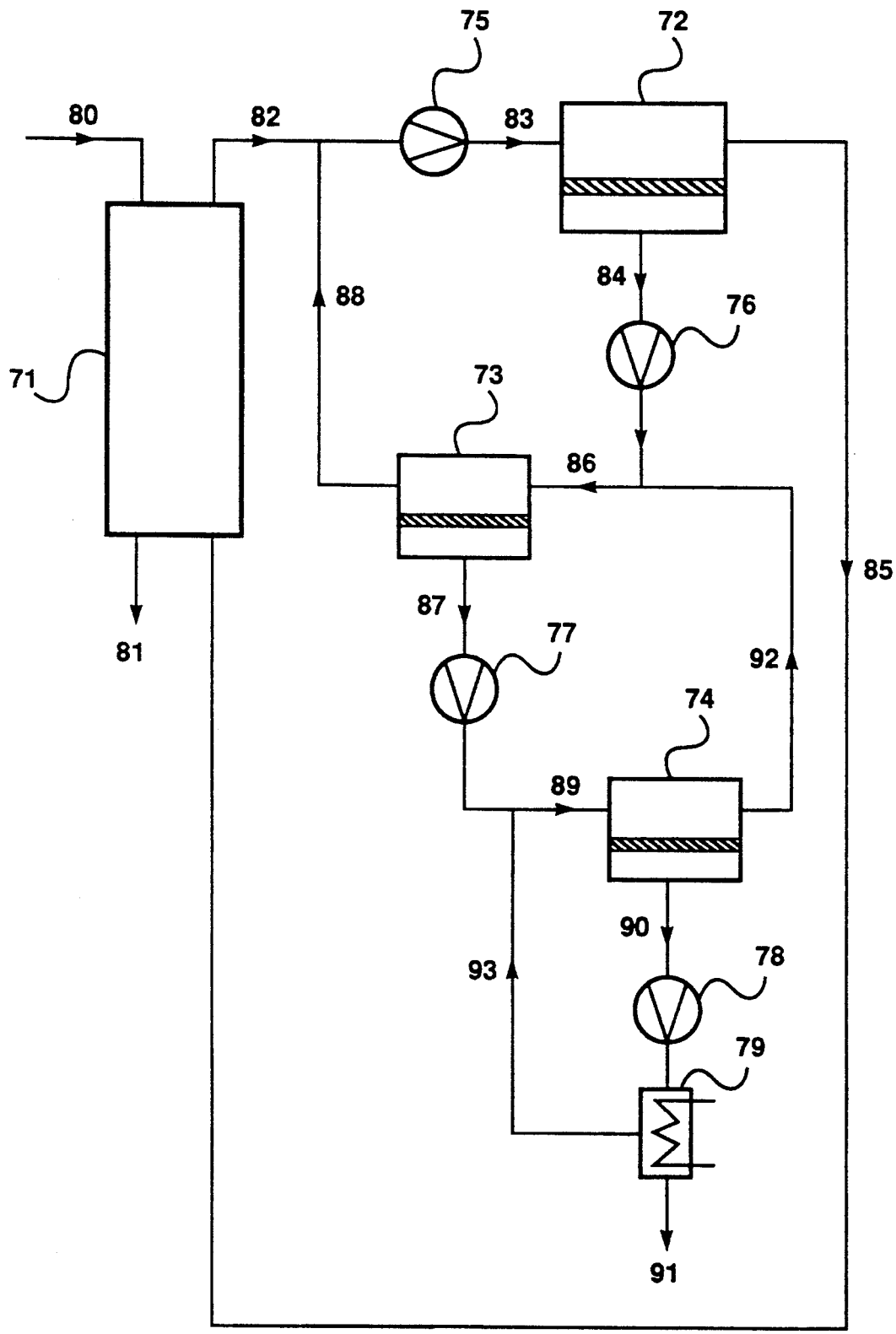
FIG. 6 is a schematic showing an embodiment of the invention using a three-stage membrane unit and recovering the organic compound by condensation.

An example of a three-stage system is shown in FIG. 6. Referring now to this figure, gas stripper 71 is used to remove an organic compound from water stream 80. The stripping gas enters the stripper as stream 85 and exits as stream 82, which is laden with organic compound. The treated water stream exits the strippers as stream 81. Gas stream 82 is compressed by compressor 75 and passes as compressed gas stream 83 to membrane separation unit 72. A vacuum pump 76 in the permeate line increases the driving force for membrane permeation. The treated gas stream 85, depleted of organic compound, is returned to the gas stripper inlet. The organic compound passes preferentially through the membrane and emerges as permeate stream 84. Permeate stream 84 is too dilute for organic compound recovery by condensation and is passed to a second membrane stage 73 for further treatment. A second vacuum pump 77 in the permeate line provides a driving force for membrane permeation. The second residue stream 88 from this stage is returned on the upstream side of the first membrane stage. Permeate stream 87 is still too dilute for organic compound recovery by condensation and is passed to a third membrane stage 74 for further treatment. A third vacuum pump 78 in the permeate line provides a driving force for membrane permeation. The third residue stream 92 from this stage is mixed with the permeate stream 84 from the first membrane stage to form the feed 86 to the second membrane stage. Permeate stream 90 from the third membrane stage is passed to condenser 79. Organic compound is recovered as liquid stream 91. Noncondensed gas 93 from the condensation step is mixed with second permeate stream 87 to form the feed 89 to the third membrane stage.

Figure 7:
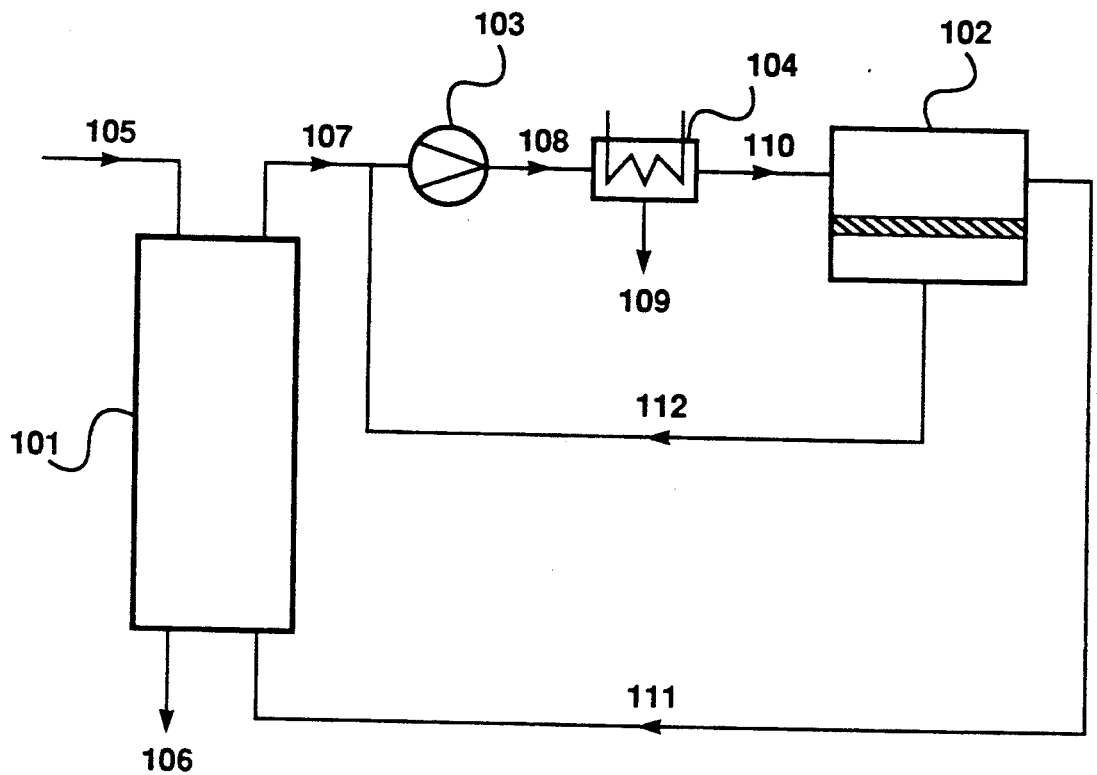
FIG. 7 is a schematic showing an embodiment of the invention using a one-stage membrane unit driven by high pressure on the feed side of the membrane.

An example of a one-stage membrane system operating in high-pressure mode is given in FIG. 7. Referring now to this figure, gas stripper 101 is used to remove an organic compound from water stream 105. The stripping gas enters the stripper as stream 1111 and exits as stream 107, which is laden with organic compound. The treated water stream exits the stripper as stream 106. Gas stream 107 is compressed by compressor 103 and passes as compressed gas stream 108 to condenser 104. An organic liquid stream is recovered from the condenser as stream 109. Noncondensed stream 110 from the condenser passes to the membrane separation unit 102 for treatment. The treated gas stream 111, depleted of organic compound, is returned to the gas stripper inlet. The organic compound passes preferentially through the membrane and emerges as permeate stream 112, which is returned upstream of the compressor and condenser for organic compound recovery.

It will be appreciated by those of skill in the art that the arrangement of compressors and vacuum pumps shown in FIGS. 5, 6 and 7, and the routing of the various residue and permeate streams are a few of the many possible configurations for the membrane system. For example, the membrane system may include "one-and-a-half" stage or "two-and-a-half" stage membrane arrangements, as described in U.S. Pat. No. 5,071,451. In these types of design, an auxiliary membrane module or set of modules is installed across the pump on the downstream side of the membrane stage, thereby improving the performance and operating efficiency of that stage. Membrane units using more than three stages are not preferred, because of the size, cost and complexity of the system.

Embodiments such as those shown conceptually in FIG. 1, and specifically in FIGS. 5, 6 and 7, that reuse all or part of the stripping gas have several advantages. Most gas strippers use air as the stripping gas. However, there are circumstances in which it would be beneficial to use a different stripping gas, for example, nitrogen or carbon dioxide if the organic compound forms potentially explosive mixtures with air. Because stripping uses and discharges very large volumes of gas, to use other gases is usually impractical and/or too costly. If the gas can be cleaned and reused, however, the amount and cost of gas used is limited and it becomes practical to strip with other gases. Inerting is one reason to use other gases than air. In this case, nitrogen, carbon dioxide, argon or any other appropriate inerting gas can be used. Alternatively, a stripping gas appropriate to the ultimate destination of the organic compound can be used. For example, if the organic compound is to be disposed of, not recovered, methane can be used as the stripping gas. The membrane unit is then used to produce a permeate stream enriched in organic compound and containing just enough methane to make disposal by incineration practical. The stripping gas can also be chosen to provide improved partitioning between the gas and water phases.

A second advantage is that reuse of the stripping gas can ease the separation burden placed on the membrane unit. If the treated gas is not discharged, a higher concentration of organic compound in the organic-depleted stream may be acceptable than would be permitted for release into the atmosphere. For example, 90% removal rather than 99% removal may be appropriate. If an embodiment using an organic-selective membrane were used, this would enable the membrane unit to be operated at a lower stage cut than would be possible if the residue were to be discharged, thereby keeping the organic compound enrichment in the permeate high and facilitating recovery of the organic compound from the permeate stream. Surprisingly, we have found that, unless very high levels of removal of organics from the incoming water are required, concentrations of organic vapor up to 10 ppmv or more in the incoming stripping gas can be tolerated before the organic compound removal from the water is substantially impaired.

In this embodiment, complete reuse of the stripping gas is preferred. In this case, the gas stripper and the membrane separation unit form an essentially closed loop and discharge of organic compounds to the atmosphere is eliminated.

2. Modified Gas:Water Ratio

The invention in this aspect is particularly useful when the stripping gas is not reused. If the gas is to be discharged, it is more difficult to reconcile the contradictory aspects of gas stripping and membrane separation, because the goal is to remove as much organic compound from the stripper exhaust gas stream as possible, while maintaining both an adequate level of water treatment by the stripper and a sufficiently enriched membrane permeate stream for condensation or other recovery or treatment. The invention in this aspect usually achieves a lesser degree of organic compound removal from the water, but a substantially lower discharge of organic compound to the atmosphere. This trade-off is accomplished by reducing the gas:water volume ratio used in the stripper. A packed tower operating in countercurrent mode most commonly uses a gas:water volume ratio up to about 500:1, although higher ratios are sometimes used. Towers operating in crossflow mode can run at higher gas:water volume ratios, and ratios up to 2,000:1–3,000:1 are not uncommon. The organic compound is diluted by a similar factor when it is transferred into the gas. Thus, if the concentration of the organic compound in the water is, for example, 200 ppm by weight, and the gas:water volume ratio is 200:1, then the organic compound concentration in the gas will be no greater than 1 ppm by weight, which is low for membrane separation treatment. If the gas:water volume ratio is reduced to 10:1, the concentration of the organic compound in the gas may be up to 20 ppm by weight, still low, but significantly easier for the membrane system to handle than 1 ppm.

To accommodate the higher-concentration, lower-volume preference of the membrane unit, it is preferred that the gas:water volume ratio in these types of embodiment be no greater than about 50:1, more preferably less than about 20:1 and most preferably less than about 10:1.

The organic compound removal from the feed water typically achieved by gas stripping ranges from about 40% removal up to about 99.99% removal. Removals of 90% and above are common. At present, most gas strippers are operated with air as the stripping gas. Some air strippers are run at gas flow rates far in excess of those needed for efficient organic compound removal, the goal being to dilute the effluent gas entering the atmosphere. If this is the case, a reduction of the gas:water volume ratio may be possible without diminishing the organic compound removal from the water. However, in many cases, reducing the gas flow rate will reduce the efficiency of the stripper, such as for example from 99% to 90% or 80% or below. The membrane system will generally achieve 80%, 90% or more removal of the organic compound that reaches it in the stripping gas. If a lower water quality can be tolerated, therefore, the quantity of organic compound released in the form of air pollution may be cut to 20%, 10% or less of its former value. For example, suppose that an existing air stripper operating without any treatment of the stripping gas achieves 95% removal of an organic contaminant from water. For every 100 g of contaminant, 5 g remain in the water after treatment and 95 g are discharged to the air. If it is acceptable to retain 10 g of organic in the water, the gas:water volume ratio can be reduced to the point where only 90% removal of organic is achieved. The stripping gas is then passed to a membrane unit which achieves 90% removal of the organic reaching it. In this case, the amount of organic being discharged to the air is 10% of 90 g, or 9 g. Thus the water quality is diminished, but the amount of organic pollution entering the atmosphere is reduced from 95 g to 9 g.

Figure 2:
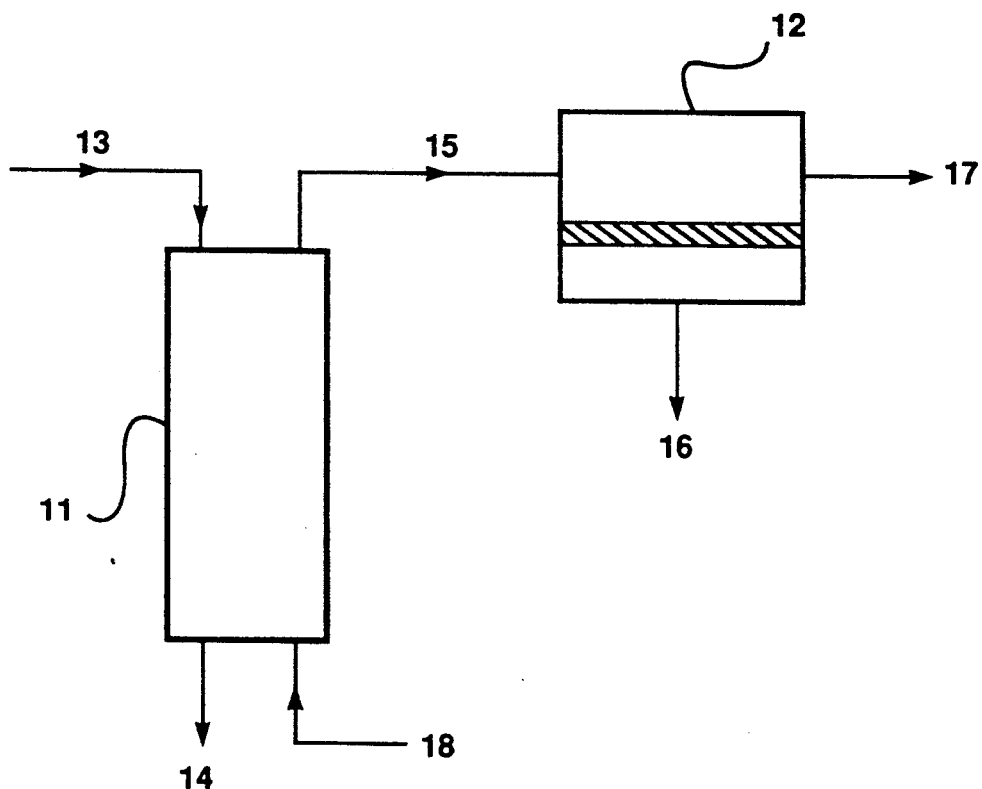
FIG. 2 is a schematic showing an embodiment of the invention in which the treated gas is discharged.

An embodiment of the invention in which a lower gas:water volume ratio is used and in which the stripping gas is discharged is shown in FIG. 2. Referring now to this figure, gas stripper 11 is used to remove an organic compound from water stream 13. The stripping gas enters the stripper as stream 18 and exits as stream 15, which is laden with organic compound. The treated water stream exits the stripper as stream 14. Gas stream 15 passes to membrane separation unit 12. The organic compound passes preferentially through the membrane and emerges as permeate stream 16. The treated gas stream, depleted of the organic compound, exits the membrane separation unit as stream 17 and is discharged.

Figure 8:
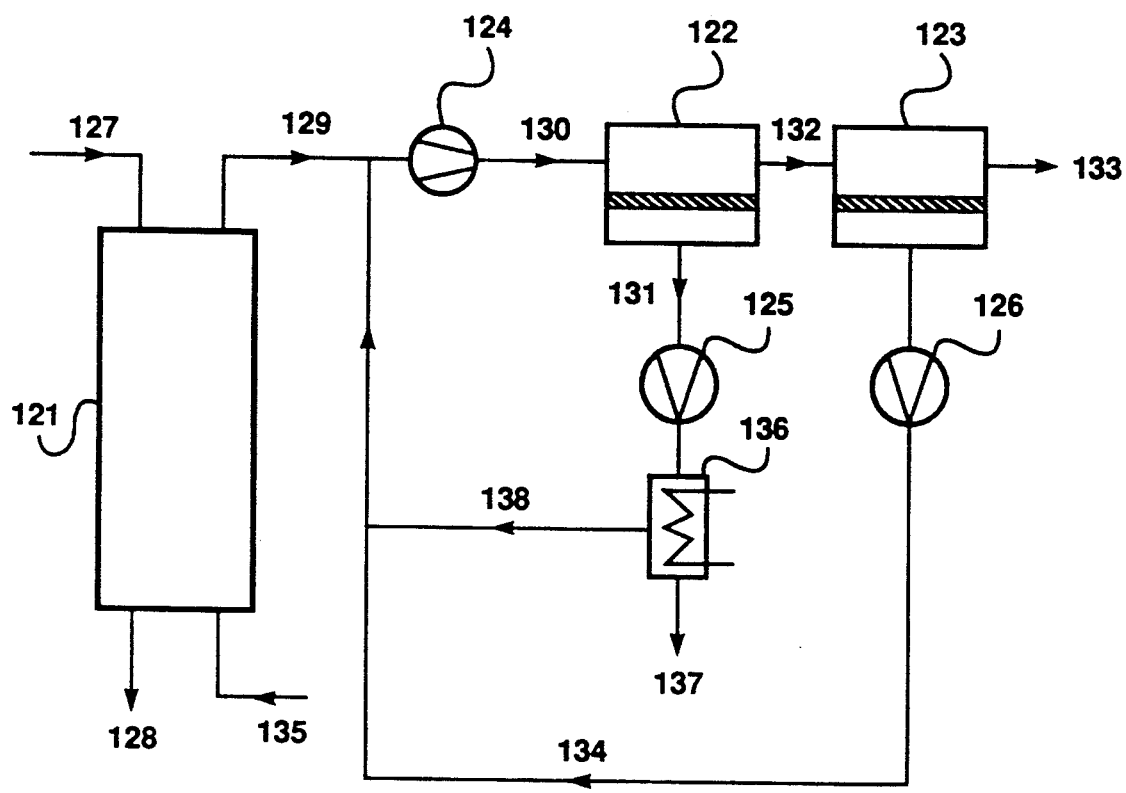
FIG. 8 is a schematic showing an embodiment of the invention using a two-step membrane unit.

As with FIG. 1, FIG. 2 is a schematic showing the process concept. The apparatus used to carry out the process will include other components such as pumps, blowers, etc. As with the embodiments described above, the membrane separation step may be carried out using one membrane stage or an array of membranes, arranged in a variety of configurations where the permeate and/or residue from the first membrane stage is passed to an additional membrane unit or units for further treatment. For example, membrane arrangements similar to those of FIGS. 5, 6 and 7 could be used. If the removal of organic compound from the feed achieved by one membrane stage is inadequate, the residue stream from the first membrane stage may be passed as the feed stream to a second membrane step to achieve a further purification. For example, if the first stage achieves 90% organic removal, then adding a similar second step will achieve a further 90% removal, or 99% removal in total. Such a configuration is shown in FIG. 8. Referring now to this figure, gas stripper 121 is used to remove an organic compound from water stream 127. The stripping gas enters the stripper as stream 135 and exits as stream 129, which is laden with organic compound. The treated water stream exits the stripper as stream 128. Gas stream 129 is compressed by compressor 124 and passes as compressed gas stream 130 to first membrane separation unit 122. A vacuum pump 125 in the permeate line increases the driving force for membrane permeation. The treated gas stream 132, depleted of organic compound, but still containing too much organic compound for discharge or reuse, is passed to a second membrane unit 123 for further treatment. A second vacuum pump 126 in the permeate line of this membrane unit increases the driving force for membrane permeation. The residue stream 133 emerging from this unit is discharged. In both membrane units, the organic compound passes preferentially through the membrane and emerges as permeate streams 131 and 134. Stream 134 is returned to the feed side of the first membrane unit for further treatment. Stream 131 is passed to condenser 136 for recovery of liquid organic stream 137. The non-condensed stream 138 from the condenser is returned for further treatment by the membrane system.

The representative designs of FIGS. 2 and 8 show discharge of the membrane residue stream. It is, of course, also possible to recirculate the residue stream to the stripper in this type of embodiment.

3. Modified Stripper Configuration

In another aspect, the invention maintains the level of water purification that would have been possible by gas stripping alone, yet simultaneously achieves a high level of organic compound removal from the stripper exhaust gas. Embodiments of this type have to reconcile the preferred operating situations for gas stripping and membrane separation without compromising either water or air quality. This result is achieved by splitting the gas stripping operation into two separate steps. The first step achieves only partial removal of the organic compound from the water and is designed to facilitate the combination of the gas-stripping operation and the membrane separation operation. The stripping gas from this step passes to the membrane separation step for removal of organic compound from the gas. The treated water from the first stripping step passes to a second gas stripper. In the second stripper, the organic compound content of the water is further reduced. Because the water passing to the second stripper contains relatively little organic compound, the gas from the second stripper may frequently be dischargeable.

Figure 3:
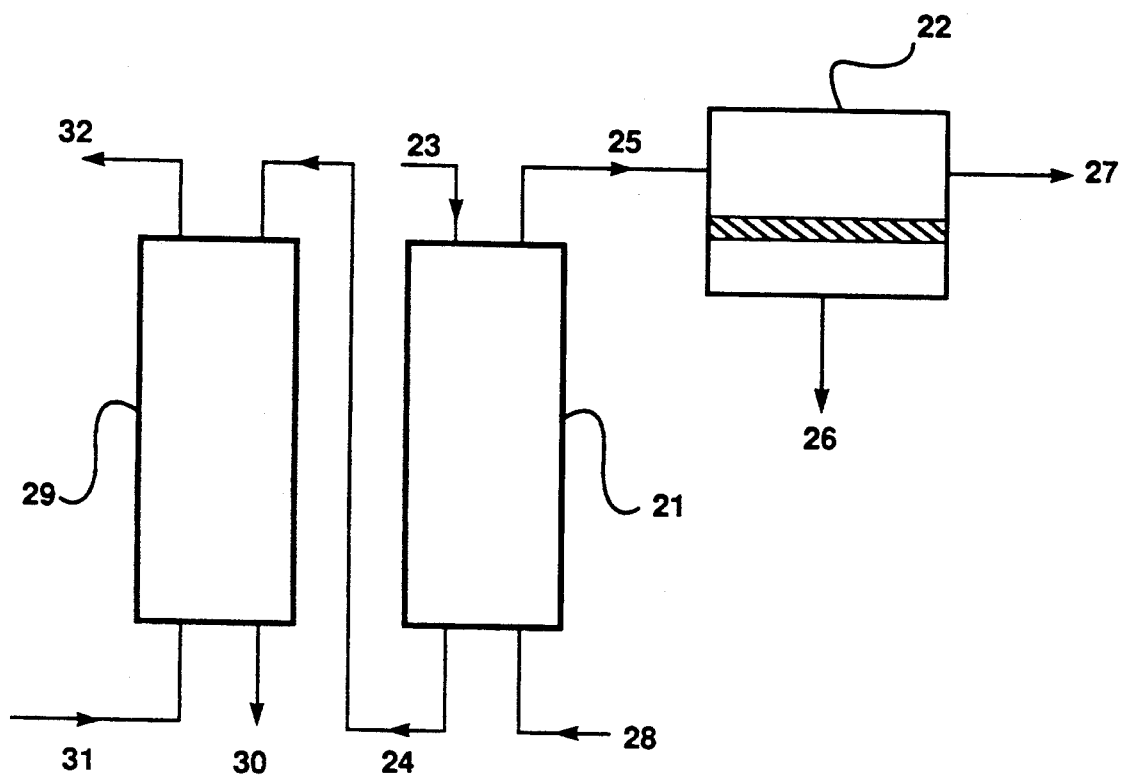
FIG. 3 is a schematic showing an embodiment of the invention using two gas strippers.

An embodiment of the invention in which two gas strippers are used is shown in FIG. 3. Referring now to this figure, first gas stripper 21 is used to partially remove an organic compound from water stream 23. The stripping gas enters the stripper as stream 28 and exits as stream 25, which is laden with organic compound. The treated water stream exits the stripper as stream 24. Gas stream 25 passes to membrane separation unit 22. The organic compound passes preferentially through the membrane and emerges as permeate stream 26. The treated gas stream, depleted of the organic compound, exits the membrane separation unit as stream 27. Stream 24 passes to the second gas stripper 29. Stripping gas enters the second stripper as stream 31 and exits as stream 32. The treated water stream exits the second stripper as stream 30.

The two strippers may be of the same type or of different types. For example, the first stripper can be a packed tower operating in counterflow mode and the second can be packed tower operating in crossflow mode. As a second example, the first stripper can be a packed tower and the second can be a trayed tower or a low-profile trayed stripper. The two strippers may also be of the same type, but operating under different conditions to achieve a different result. For example the first may operate at a relatively low gas:water volume ratio such as less than about 50:1 or lower, such as less than about 20:1 or even 10:1; the second may operate at a higher gas:water volume ratio, such as greater than about 10:1 or greater than about 50:1. It will be apparent to those of skill in the art that many different combinations of stripping system may be employed.

The useful benefits that derive from this type of embodiment can be illustrated by comparing the performance of a conventional stripper with that of the process and apparatus of the invention. For comparison, if a single gas stripper achieving 91% removal of organic compound from the water is used alone without treatment of the stripping gas, then 91% of the organic compound originally present in the water will be discharged to the atmosphere. Suppose that two strippers, each operating at a reduced efficiency of only 70%, are used instead. If the first stripper achieves 70% organic compound removal from the water, the water passing to the second stripper contains 30% of the originally present organic compound. If this stripper also achieves 70% removal of the organic compound that reaches it, the net result will be the removal of 91% of the organic compound originally present in the water, the same result as was achieved with the single stripper. If the membrane separation operation removes 90% of the organic compound that reaches it, then it will remove 63% of the organic compound originally present in the water and will discharge 7% to the atmosphere. The gas from the second stripper contains 21% of the organic compound originally present in the water. Thus 28% of the organic compound that was originally in the water will be discharged, compared with 91% for the single stripper operating alone. If the strippers both achieve 80% removal of organic compound from water and the membrane separation operation removes 90% of the organic compound reaching it, the net removal from the water is 96% and the amount of organic discharged to the atmosphere is 24% of that originally present in the water.

Alternatively, two strippers with unlike performance may be used. For example the gas:water volume ratio of the first may be reduced to facilitate the membrane separation step and a high gas:water volume ratio may be used in the second stripper to achieve maximum removal of the remaining organic compound from the water. If the first stripper achieves only 70% organic compound removal from the water, the water passing to the second stripper contains 30% of the originally present organic compound. If this stripper achieves 90% removal of the organic compound that reaches it, the net result will be the removal of 97% of the organic compound originally present in the water. If the membrane separation operation removes 90% of the organic compound that reaches it, then 7% of the organic compound originally present in the water will be discharged to the atmosphere from the first stripper. The gas from the second stripper contains 28.5% of the organic compound originally present in the water. Thus 35.5% of the organic compound that was originally in the water will be discharged to the atmosphere, compared with 97% if a single stripper was used without treatment of the exhaust gas. If the first stripper achieves 85% removal of organic compound from water, the second stripper 95% and the membrane separation operation 90%, the net removal from the water will be 99.25% and the amount of organic discharged to the atmosphere would be 23% of that originally present in the water, compared with 99.25% if a single stripper was used without treatment of the exhaust gas.

As with the other embodiments, the membrane separation step may be carried out using one membrane stage or an array of membranes. For example, if 90% removal of the organic compound present in the feed to the membrane unit is inadequate, the residue stream from the first membrane stage may be passed as the feed stream to a second step to achieve a further 90% removal, or 99% removal in total. The permeate stream may also be passed to second or third membrane stages as necessary.

It may be seen, therefore, that there is a great deal of flexibility for tailoring the amounts of organic remaining in the water and discharged to the atmosphere to meet specific requirements. FIG. 3 shows discharge of the treated residue stream from the membrane unit. It is, of course, possible and often desirable to recirculate the residue gas stream from the membrane unit for reuse in the gas-stripping step.

It is also possible to replace the second gas stripper by some other treatment process. For example, the concentration of organic in the treated water exiting the first stripper will normally be reduced to a small percentage of its original value. This may bring the stream into a concentration range where treatment by adsorption, absorption, catalytic incineration, chemical destruction, ozonation, biological treatment, etc. may be appropriate and may have technical or financial advantages over using a second stripper. As a second example, the water to be treated may contain both volatile, chlorinated compounds and less volatile, nonchlorinated compounds. If the first stripper is used to remove the chlorinated compounds, the residual compounds may be treated safely and effectively by a biological plant.

4. Stripper Run at Reduced Pressure

In another aspect, the invention involves adapting the gas-stripping operation to facilitate combination with membrane separation by operating the gas-stripping step under reduced pressure compared with the membrane separation step. Suppose, for example, the stripper is operated at a gas pressure of 0.5 atm by connecting a vacuum pump in the outlet line from the gas stripper between the gas stripper and the membrane unit and further suppose that the downstream side of the vacuum pump is at 1 atm pressure. Then the pressure on the feed side of the membrane is twice that within the stripper, the volume flow of gas passing through the membrane unit is half that passing through the gas stripper and the volume concentration of organic compound entering the membrane unit will be twice the equilibrium concentration in the gas stripper. In this way the gas volume is reduced and its concentration increased before it reaches the membrane unit for treatment. The same concentrating effect may be achieved by using a compressor between the stripper and the membrane unit.

Figure 4:
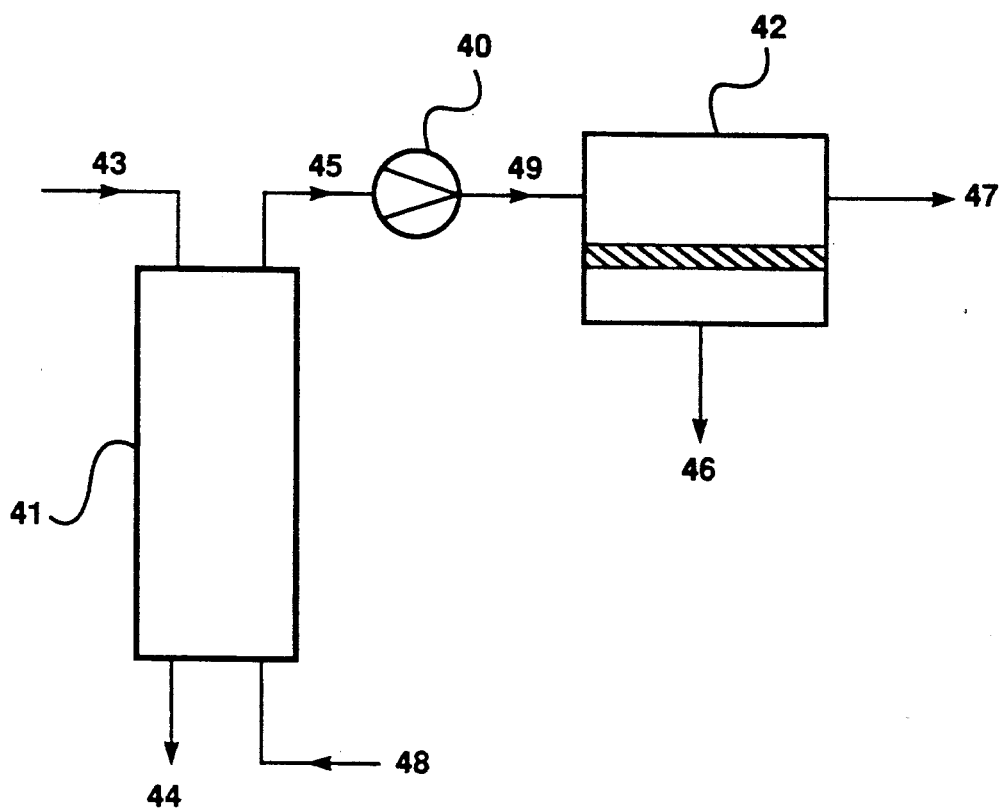
FIG. 4 is a schematic showing an embodiment of the invention in which the stripping gas is at subatmospheric pressure.

An embodiment of the invention in which the gas stripper is operated at subatmospheric pressure is shown in FIG. 4. Referring now to this figure, gas stripper 41 is used to remove an organic compound from water stream 43. The stripping gas enters the stripper as stream 48 and is drawn through the stripper by vacuum pump 40, which draws a partial vacuum on the stripper. The stripping gas exits the stripper as stream 45, laden with organic compound, and passes through vacuum pump 40 emerging as feed stream 49 to the membrane unit 42. Stream 49 is, therefore, at higher pressure than stream 45. The organic compound passes preferentially through the membrane and emerges as permeate stream 46. The treated gas stream, depleted of the organic compound, exits the membrane separation unit as stream 47. The treated water stream exits the stripper as stream 44.

As with FIGS. 1, 2 and 3, FIG. 4 is a schematic showing the process concept. The apparatus used to carry out the process will include other components such as pumps, blowers, etc. and the membrane unit can contain one membrane stage or an array of multiple stages and/or steps.

Figure 9:
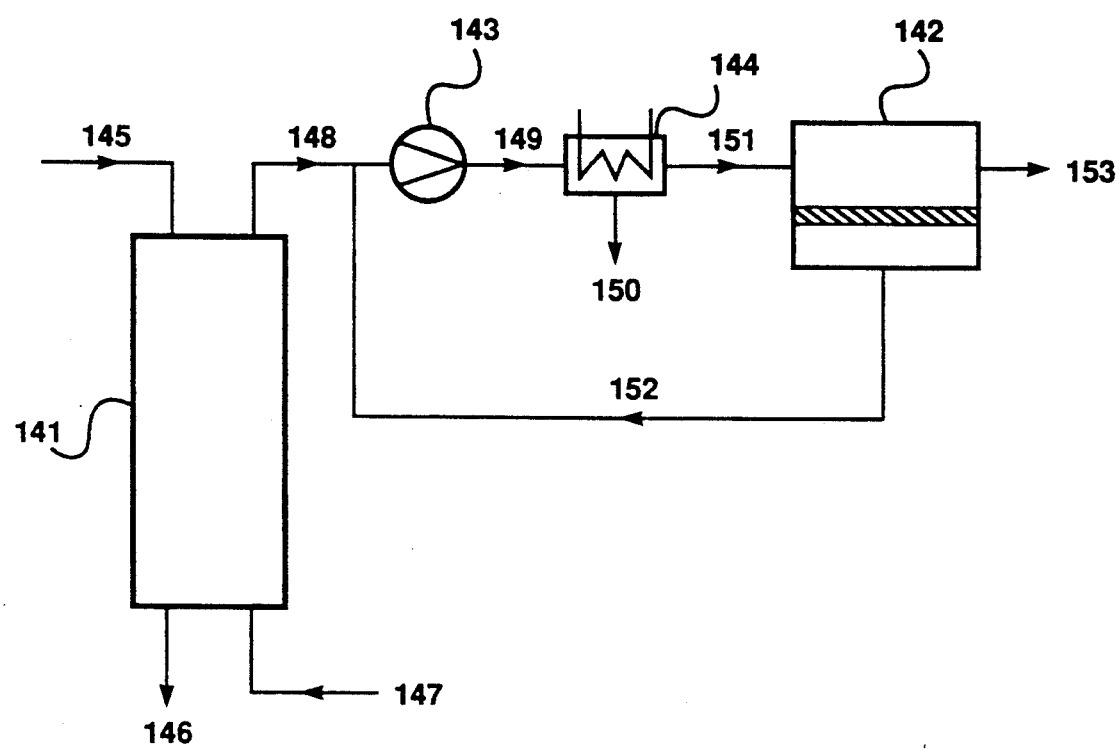
FIG. 9 is a schematic showing an embodiment of the invention in which a vacuum pump is used to lower the pressure of the stripping operation and provide a driving force for membrane permeation.

If the membrane system is driven by lowering the pressure on the permeate side, the same vacuum pump may conveniently be used both to lower the pressure of the stripping operation and to provide a driving force for membrane permeation. Such an embodiment is shown in FIG. 9. Referring now to this figure, gas stripper 141 is used to remove an organic compound from water stream 145. The stripping gas enters the stripper as stream 147 and is drawn through the stripper by vacuum pump 143, which draws a partial vacuum on the stripper. The vacuum pump is also connected to the permeate line from membrane unit 142 and thus provides a driving force for membrane permeation. The stripping gas exits the stripper as stream 148, laden with organic compound, mixes with permeate stream 152 from the membrane unit and passes through vacuum pump 143 emerging as stream 149, which is passed to condenser 144. An organic liquid stream is recovered from the condenser as stream 150. Noncondensed stream 151 from the condenser passes to the membrane unit 142 for treatment. The treated gas stream, depleted of the organic compound, exits the membrane separation unit as stream 153. The treated water stream exits the stripper as stream 146.

If an embodiment such as that of FIG. 9 is used, it may be convenient to use a liquid ring pump as the vacuum pump and condense the organic compound directly in the pump. The organic compound then acts as the sealing liquid for the pump.

A further advantage of running the gas stripper at subatmospheric, rather than atmospheric, pressure is that enhanced partitioning of the organic compound from the water into the gas is achieved.

For simplicity, the representative embodiments in items 1–4 above have been described for the case where the membrane is selectively permeable to the organic compound over the stripping gas, so that the membrane permeate stream is the organic-enriched stream and the membrane residue stream is the organic-depleted stream. Those of skill in the art will recognize that comparable processes can be designed using membranes selectively permeable to the stripping gas. In this case, the purified gas stream for reuse or discharge will be the membrane permeate stream, and the organic-enriched stream will be the membrane residue stream. Such embodiments may be preferred when the organic compound content of the gas stream to be treated is unusually high, for example.

In all embodiments, transfer of organic compound from the liquid phase into the gas phase in the stripper is enhanced by heating the water stream. Direct heating may be used, but it is preferable wherever possible to design the combined gas stripping/membrane separation apparatus to take advantage of heat exchange possibilities. As nonlimiting examples, the incoming feed water may be warmed by using it to cool any vacuum pumps or compressors used in the apparatus. If chilling is used to condense some of the organic compound prior to entry into the membrane unit, the gas passing through the membrane unit will be cool. This gas can be used to cool any vacuum pumps or compressors in the apparatus and then returned warm to the gas stripper. Depending on the specific system design and components, many such heat-integration arrangements will be apparent to those of skill in the art.

Embodiments of the invention in which steam forms all or at least part of the stripping gas are contemplated. The steam carries heat into the stripping tower and facilitates organic compound removal by heating the fluid to be stripped. The steam also provides a volume of gas into which the dissolved organic compounds can partition. Some steam condenses as it passes through the stripper, resulting in concentration of the organics in the remaining noncondensed strip gas. The steam in the exit stripping gas can be condensed before the exhaust gas is passed to the membrane unit for treatment. This has a similar effect to drawing a partial vacuum on the stripper, in that the volume of gas passing to the membrane unit is reduced compared with the volume of strip gas and the concentration of organic compound in the gas is, therefore, increased.

The invention is now further illustrated by the following examples, which are intended to be illustrative of the invention, but are not intended to limit the scope or underlying principles of the invention in any way.

EXAMPLES

Example 1 Construction of Apparatus

Figure 19:
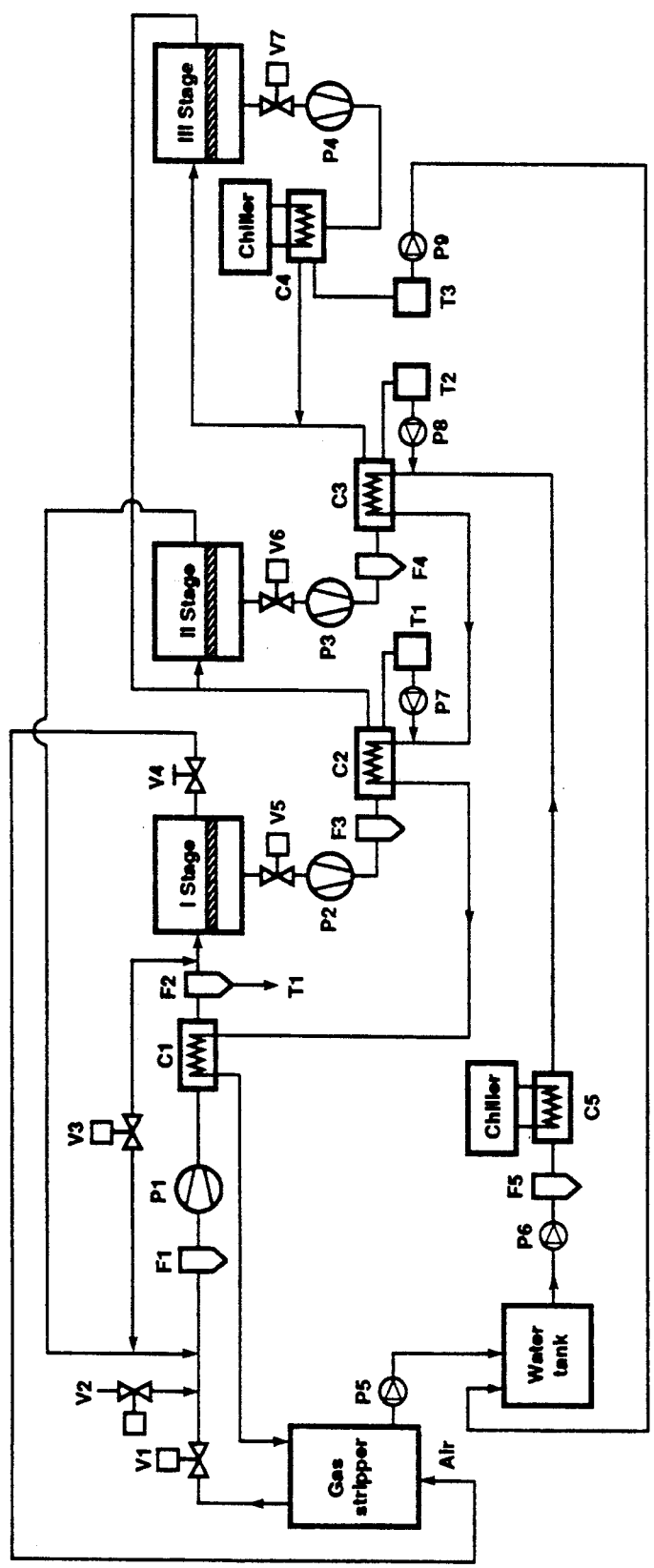
FIG. 19 is a schematic diagram of the component layout of the experimental apparatus.

An experimental apparatus of the general type shown in FIG. 6 was constructed. The apparatus consisted of a gas stripper combined with a three-stage membrane system. FIG. 19 shows the layout of the apparatus, which contained the following components:

Gas stripper
First-stage membrane unit
Second-stage membrane unit
Third-stage membrane unit
Water supply tank
Pumps: P1, P2, P3, P4, P5, P6, P7, P8, P9
Chillers or condensers: C1, C2, C3, C4, C5
Collecting tanks: T1, T2, T3
Filters: F1, F2, F3, F4, F5
Valves: V1, V2, V3, V4, V5, V6, V7

The gas stripper was custom-built so that it could fit inside a laboratory with a 14-ft ceiling height. The characteristics of the stripper were as follows:

Overall height: 14 ft
Diameter: 3 ft
Packing height: 10 ft
Packing type: Tri-Packs #$\frac{1}{2}$
Gas:water volume ratio: $\approx 5:1$ The first-stage membrane unit consisted of 14 spiral-wound membrane modules. The modules each contained 4 $m^2$ of composite membrane with a rubbery selective layer and were housed in PVC vessels. The second-stage membrane unit consisted of 10 spiral-wound membrane modules. The modules each contained 1.5 $m^2$ of composite membrane with a rubbery selective layer and were housed in PVC vessels. The third-stage membrane unit consisted of one spiral-wound membrane module containing 2 $m^2$ of composite membrane with a rubbery selective layer. The third stage was housed in a stainless steel pressure vessel. The stripper and the three-stage membrane system were connected to provide flow of the various feed, permeate and residue streams substantially as shown in FIG. 6. A water supply tank was connected to the stripper inlet to provide a simulated contaminated water stream. Pump P1 was a dry running rotary vane 20 hp compressor capable of delivering 100 scfm at 15 psig and was installed between the stripper and the first stage membrane unit. Particulate filter F1 was installed upstream of compressor P1 to trap dirt. Condenser/heat exchanger C1 was installed as an aftercooler to the compressor, using incoming water as cooling water. Filter F2 was a moisture separator installed downstream of condenser C1. Any liquid collected as a result could be directed to holding tank T1. Pumps P2 and P3 were oil-lubricated rotary vane vacuum pumps rated at 17.5 hp and 7.5 hp respectively. Filters F3 and F4 were oil-mist coalescing filters installed downstream of the pumps. Pump P4 was an explosion-proof liquid ring pump rated at 5 hp. Pumps P2, P3 and P4 were installed in the permeate lines from the various membrane stages. Pumps P5 and P6 were installed in the water inlet and outlet lines of the gas stripper to circulate water through the stripper. Condensers/heat exchangers C2 and C3 were installed in the permeate lines from the first and second membrane stages. The lines through the heat exchangers were connected so that incoming water could be warmed by using it to cool the respective permeate gas streams. Holding tanks T1 and T2 were connected to the heat exchangers to store condensed fluids. Pumps P7 and P8 were connected to tanks T1 and T2 to return fluid to the water supply line. Chiller/condenser C4 was installed in the permeate line from the third membrane stage to condense recovered organics. Holding tank T3 was installed in the permeate line to store condensed organic. Pump P9 was connected to tank T3. Pump P9 was connected in the overflow line from tank T3 to return recovered organics for remixing in the water supply tank. Chiller/heat exchanger C5 was installed in the water supply line to the stripper to cool incoming water as necessary to simulate groundwater. Filter F5 was a water filter installed in the outlet line from the water supply tank.

Example 2

The apparatus of Example 1 was used in a preliminary set of experiments to measure the removal of trichloroethylene (TCE) from water mixtures. Air was used as the stripping gas. All air and water samples withdrawn from the apparatus were analyzed by GC. For the purposes of the experiment, the apparatus was operated in a completely closed mode, as shown in FIG. 19. The residue stream from the first-stage membrane unit was returned to the stripper and the liquid trichloroethylene recovered from the third-stage condenser was returned to a water tank that was used to provide the raw liquid to the stripper. The TCE concentration in the water supply to the stripper was about 0.3 ppmw. The TCE concentration in the exhaust gas from the air stripper was about 14 ppmv. The TCE concentrations at the inlets to the first, second and third membrane stages were 25.9, 1,050 and 22,300 ppmv, respectively. No TCE could be detected in the water exiting the stripper.

The experiment was repeated at a higher water concentration of about 5 ppmw. Again, no TCE could be detected in the water exiting the stripper. These experiments showed that both the membrane units and the stripper were working, but that a more sensitive detector was needed for the fluid analysis.

Example 3

The apparatus of Example 1 was again used to measure the removal of trichloroethylene (TCE) from water mixtures. Air was again used as the stripping gas. The apparatus was operated in a completely closed mode. Air flow rates through the stripper of 64–70 scfm were used. The water flow rate was varied from 60 gpm to 125 gpm, giving air:water volume ratios of 3.9 to 8.1. The concentration of organic compound in the water was varied over more than an order of magnitude, from 2.4 to 30 ppmw. The concentration of organic compound in the exhaust air from the stripper also ranged over an order of magnitude, from 63 ppmv to 670 ppmv. A purge and trap system was added to the GC used to perform the water analysis. The results are listed in Table 1.

TABLE 1

Performance Data of Combined Stripper/Membrane Separation System Operating with Trichloroethylene (TCE) as Model Contaminant. Air Flow Rates 64-70 scfm.

| Exp. No. | Air flow rate (scfm) | Water flow rate (gpm) | A/W volume ratio (—) | Water Inlet conc. (ppmw) | Removal by Stripper (%) | Air Outlet conc. (ppmv) | Removal by Membrane (%) |
|---|---|---|---|---|---|---|---|
| 1 | 68 | 104 | 4.9 | 8.6 | 69 | 200 | 94 |
| 2 | 68 | 98 | 5.2 | 5.6 | 75 | 230 | 87 |
| 3 | 68 | 120 | 4.2 | 9.2 | 80 | 250 | 92 |
| 4 | 65 | 100 | 4.8 | 11 | 73 | 210 | 95 |
| 5 | 65 | 125 | 3.9 | 11 | 66 | 240 | 95 |
| 6 | 65 | 60 | 8.1 | 7.1 | 75 | 95 | 93 |
| 7 | 66 | 100 | 4.9 | 21 | 77 | 450 | 93 |
| 8 | 64 | 100 | 4.8 | 2.4 | 71 | 63 | 94 |
| 9 | 70 | 105 | 4.9 | 30 | 62 | 670 | 94 |
| 10 | 66 | 98 | 5.0 | 4.6 | 76 | 160 | 95 |

The stripper removed 62–80% of the TCE from the water stream that enters the stripper; the membrane system removed 87–95% of the TCE from the air that leaves the stripper. The table shows that the combined stripper/membrane separation apparatus achieves useful removal and recovery of the organic compound over a range of conditions that embrace an order of magnitude variation in organic compound concentration in the raw feed water and in the exhaust air.

EXAMPLE 4

The apparatus of Example 1 was again used in closed mode to measure the removal of trichloroethylene (TCE) from water mixtures, using lower air flow rates of 46–48 scfm. The water flow rate was varied from 55 gpm to 120 gpm, giving air:water volume ratios of 2.9 to 6.2. The concentration of organic compound in the water was varied from 4 to 8 ppmw. The concentration of organic compound in the exhaust air from the stripper ranged from about 70–200 ppmv. A purge and trap system was added to the GC used to perform the water analysis. The results are listed in Table 2.

system removed 96–98% of the TCE from the air that leaves the stripper.

Comparing Tables 1 and 2, the best result was obtained in Experiment 13, which had the lowest air and water flow rates; the worst result was obtained in Experiment 9, which had the highest air and water flow rates.

Figure 10:
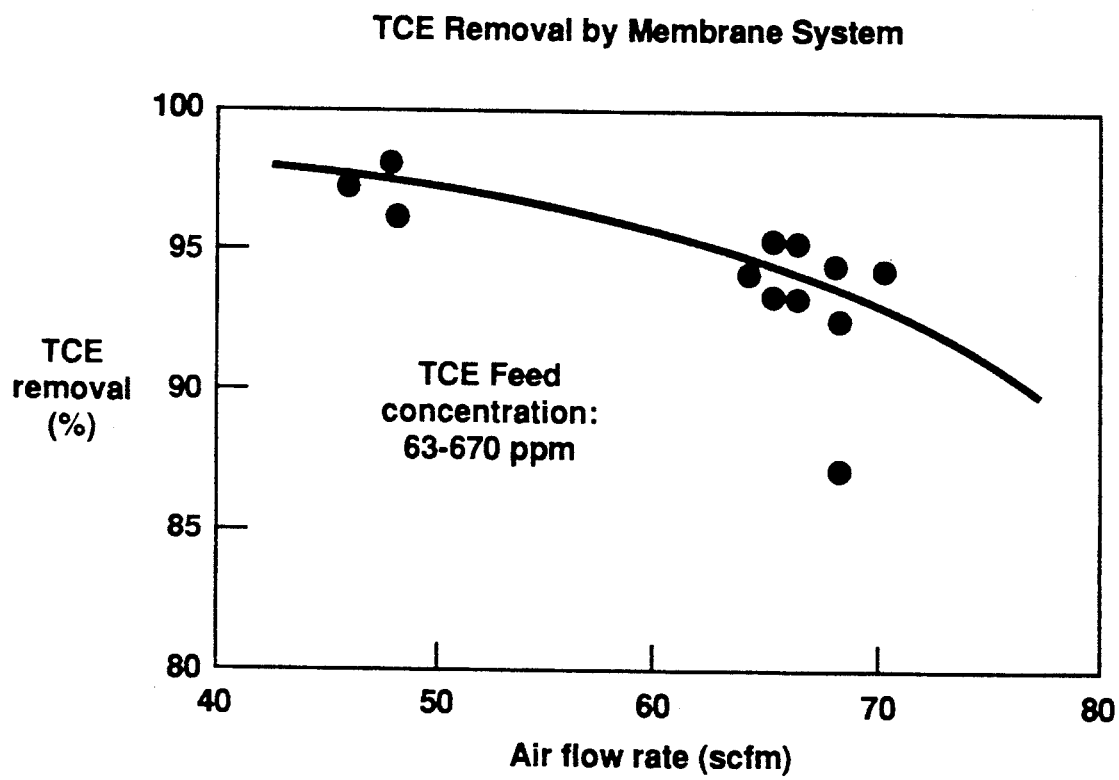
FIG. 10 is a graph of TCE removal achieved by the membrane part of the experimental apparatus as a function of the feed gas flow rate.
Figure 11:
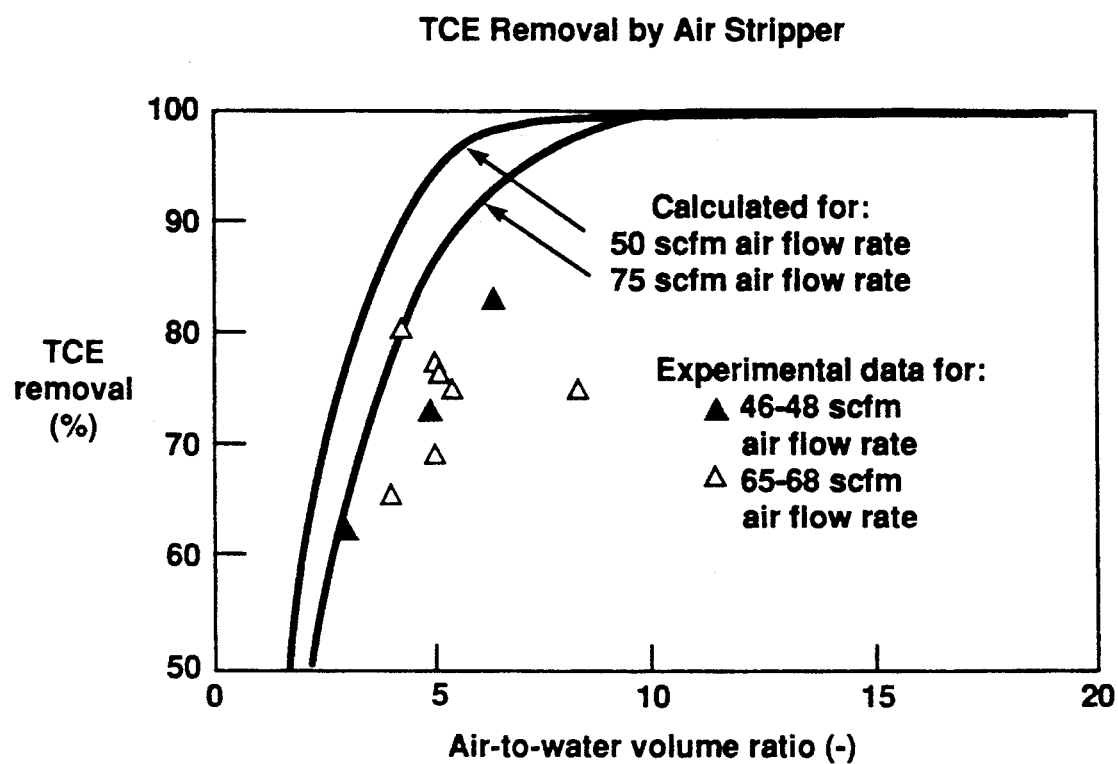
FIG. 11 is a graph of TCE removal achieved by the stripper part of the experimental apparatus as a function of the gas:water volume ratio.
Figure 12:
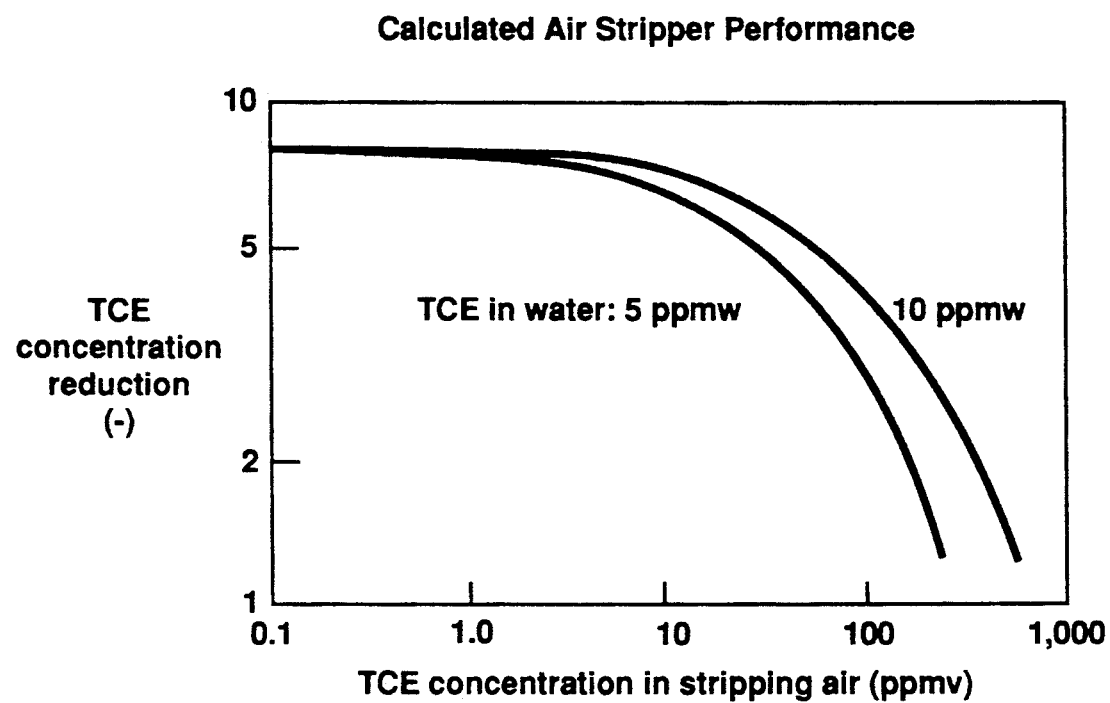
FIG. 12 is a graph of TCE removal achieved by the stripper part of the experimental apparatus as a function of the TCE concentration in the stripping gas.

The results of Experiments 1–13 are further analyzed in FIGS. 10–12. FIG. 10 shows the TCE removal achieved by the membrane system, as a function of the flow rate of the air entering the membrane system. The removal decreases with increasing flow rate. The data in FIG. 10 represent experiments in which the TCE concentration in the feed air varied between 63 and 670 ppm. This variance of more than an order of magnitude does not appear to affect the TCE removal achieved. This suggests that the TCE air concentration can be lowered substantially before the TCE removal by the membrane will decrease.

The performance of the stripper is analyzed in FIG. 11, which shows the TCE removal achieved by the stripper as a function of the air-to-water volume ratio. FIG. 11 contains two curves calculated for the stripper: one for a 50 scfm air flow rate and one for 75 scfm air flow rate. The experimental removal data are all lower than the calculated data, even through the actual air flow rates are in the same range. The stripper operates slightly less efficiently than the calculated predictions. The fact that lowering the air flow rate substantially improves the stripper performance shows that the TCE removal is limited by the contact area available for mass transfer. Using a taller stripper tower (not possible in the laboratory) would increase the TCE removal. The calculated results are all based on no TCE being present in the air stripper inlet air. The actual TCE concentration in the inlet air is approximately 10 ppmv for TCE water inlet concentrations around 10 ppmw. FIG. 12 shows that a TCE concentration of 10 ppmv in the stripping gas will have only a slight effect on the TCE removal at 10 ppmw TCE inlet water concentration.

TABLE 2

Performance Data of Combined Stripper/Membrane Separation System Operating with Trichloroethylene (TCE) as Model Contaminant. Air Flow Rates 46-48 scfm.

| Exp. No. | Air flow rate (scfm) | Water flow rate (gpm) | A/W volume ratio (—) | Water Inlet conc. (ppmw) | Removal by Stripper (%) | Air Outlet conc. (ppmv) | Removal by Membrane (%) |
|---|---|---|---|---|---|---|---|
| 11 | 48 | 74 | 4.8 | 6.3 | 73 | 120 | 96 |
| 12 | 48 | 120 | 2.9 | 7.9 | 62 | 200 | 98 |
| 13 | 46 | 55 | 6.2 | 4.0 | 83 | 69 | 97 |

The stripper removed 62–83% of the TCE from the water stream that enters the stripper; the membrane

Example 5

The apparatus of Example 1 was used in closed mode to measure the removal of carbon tetrachloride (TETRA) from water. Air was used as the stripping gas. Air flow rates through the stripper of 50-66 scfm were used. The water flow rate was varied from 60 gpm to 125 gpm, giving air:water volume ratios of 3.0 to 8.0. The concentration of organic compound in the water was varied over more than an order of magnitude, from 0.15 to 3.7 ppmw. The concentration of organic compound in the exhaust air from the stripper also ranged over more than an order of magnitude, from 3.8 ppmv to 110 ppmv. A purge and trap system was added to the GC used to perform the water analysis. The results are listed in Table 3.

TABLE 3

Performance Data of Combined Stripper/Membrane Separation System Operating with Carbon Tetrachloride (TETRA) as Model Contaminant.

| Exp. No. | Air flow rate (scfm) | Water flow rate (gpm) | A/W volume ratio (—) | Water Inlet conc. (ppmw) | Removal by Stripper (%) | Air Outlet conc. (ppmv) | Removal by Membrane (%) |
|---|---|---|---|---|---|---|---|
| 14 | 65 | 100 | 4.8 | 2.3 | 91 | 72 | 89 |
| 15 | 66 | 101 | 4.9 | 1.6 | 88 | 35 | 86 |
| 16 | 65 | 125 | 3.9 | 3.0 | 83 | 110 | 92 |
| 17 | 65 | 60 | 8.0 | 3.7 | 96 | 61 | 90 |
| 18 | 65 | 102 | 4.7 | 0.40 | 75 | 13 | 71 |
| 19 | 63 | 100 | 4.7 | 0.15 | 60 | 3.8 | 74 |
| 20 | 50 | 100 | 3.7 | 1.9 | 80 | 80 | 93 |
| 21 | 50 | 60 | 6.2 | 3.0 | 91 | 80 | 93 |
| 22 | 50 | 125 | 3.0 | 1.8 | 80 | 80 | 93 |

Depending on the TETRA concentration in the water stream, the stripper removed 60-96% of the TETRA from the water stream entering the stripper; the membrane system removed 71-93% of the TETRA from the air leaving the stripper.

TETRA is more volatile than TCE and has a larger Henry's law coefficient than TCE: 0.96 for TETRA versus 0.41 for TCE, at 20° C. Therefore, the removal obtained in the air stripper is larger for TETRA than for TCE. The TETRA removal obtained by the membrane system is less than the removal observed for TCE because of the lower concentrations of TETRA in the water inlet stream.

Figure 13:
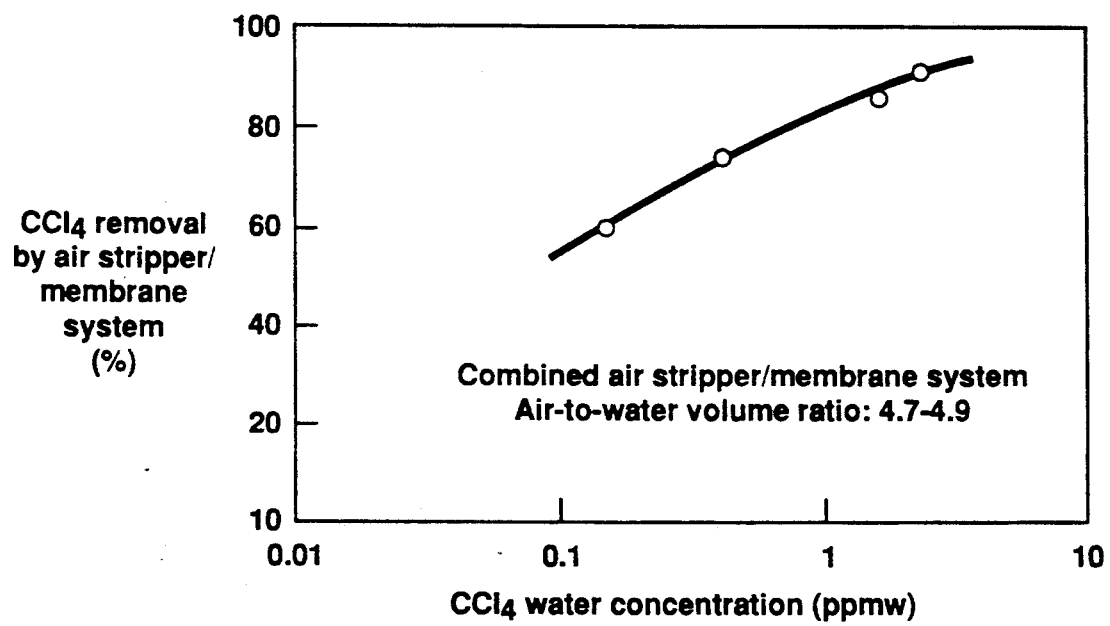
FIG. 13 is a graph of TETRA removal achieved by the experimental apparatus as a function of the TETRA concentration in the incoming water.
Figure 14:
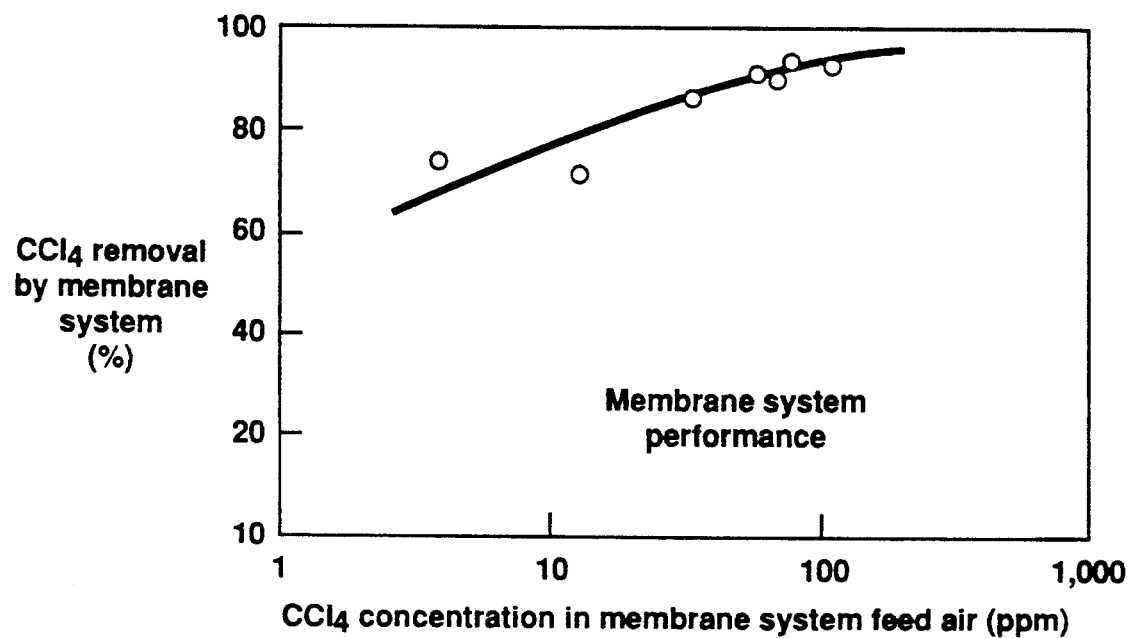
FIG. 14 is a graph of TETRA removal achieved by the membrane part of the experimental apparatus as a function of the TETRA concentration in the membrane system feed gas.

FIG. 13 shows that the TETRA removal achieved by the combined system decreases as the TETRA concentration in the treated water stream decreases. The decrease is caused in part by a reduction in the percentage of TETRA removed by the membrane system from the recirculating air stream, as is shown in FIG. 14. This behavior is expected, because a lower TETRA inlet concentration makes it more difficult to achieve condensation of TETRA in the third stage of the membrane system.

Example 6

The apparatus of Example 1 was used in closed mode to measure the removal of 1,2-dichloroethane (DCA) from water. Air was used as the stripping gas. Air flow rates through the stripper of 63-67 scfm were used. The water flow rate was varied from 60 gpm to 100 gpm, giving air:water volume ratios of 5.0 to 8.1. The concentration of organic compound in the water was varied over more than an order of magnitude, from 0.5 to 9.63 ppmw. The concentration of organic compound in the exhaust air from the stripper also ranged over more than an order of magnitude, from 2.8 ppmv to 77 ppmv. A purge and trap system was added to the GC used to perform the water analysis. The results are listed in Table 4.

TABLE 4

Performance Data of Combined Stripper/Membrane Separation System Operating with 1,2 Dichloroethane (DCA) as Model Contaminant.

| Exp. No. | Air flow rate (scfm) | Water flow rate (gpm) | A/W volume ratio (—) | Water Inlet conc. (ppmw) | Removal by Stripper (%) | Air Outlet conc. (ppmv) | Removal by Membrane (%) |
|---|---|---|---|---|---|---|---|
| 23 | 67 | 100 | 5.0 | 9.6 | 18 | 77 | 94 |
| 24 | 65 | 60 | 8.1 | 7.8 | 29 | 63 | 92 |
| 25 | 63 | 62 | 7.6 | 3.5 | 21 | 26 | 90 |
| 26 | 63 | 62 | 7.6 | 0.5 | 12 | 2.8 | 71 |

Depending on the DCA concentration in the water stream, the stripper removed 12-29% of the DCA from the water stream entering the stripper; the membrane system removed 71-94% of the DCA from the air leaving the stripper. The comparatively poor performance of the stripper is caused by a small Henry's law coefficient. Better performance could be achieved in this case with a two-stripper type of embodiment or with a different type of stripper.

Example 7

The apparatus of Example 1 was used in closed mode to measure the removal of perchloroethylene (PERC) from water. Air was used as the stripping gas. An air flow rate of 66 scfm and a water flow rate of 98 gpm were used, giving an air:water volume ratio of 5.0. A purge and trap system was added to the GC used to perform the water analysis. The results are listed in Table 5.

TABLE 5

Performance Data of Combined Stripper/Membrane Separation System Operating with Perchloroethylene (PERC) as Model Contaminant.

| Air flow | Water flow | A/W volume | Water Inlet | Removal by | Air Outlet | Removal by |

TABLE 5-continued

| Exp. No. | rate (scfm) | rate (gpm) | ratio (—) | conc. (ppmw) | Stripper (%) | conc. (ppmv) | Membrane (%) |
| --- | --- | --- | --- | --- | --- | --- | --- |
| 27 | 66 | 98 | 5.0 | 4.6 | 76 | 160 | 95 |

Example 8

The apparatus of Example 1 was used in closed mode to measure the removal of chloroform from water. Air was used as the stripping gas. Air flow rates through the stripper of 60 and 61 scfm were used. The water flow rate was varied from 60 gpm to 123 gpm, giving air:water volume ratios of 3.6 to 7.6. The concentration of organic compound in the water was varied over an order of magnitude, from 0.38 to 4.5 ppmw. The concentration of organic compound in the exhaust air from the stripper also ranged over an order of magnitude, from 6.8 ppmv to 79 ppmv. A purge and trap system was added to the GC used to perform the water analysis. The results are listed in Table 6.

TABLE 6

| | Performance Data of Combined Stripper/Membrane Separation System Operating with Chloroform as Model Contaminant | | | | | | |
| --- | --- | --- | --- | --- | --- | --- | --- |
| Exp. No. | Air flow rate (scfm) | Water flow rate (gpm) | A/W volume ratio (—) | Water Inlet conc. (ppmw) | Removal by Stripper (%) | Air Outlet conc. (ppmv) | Removal by Membrane (%) |
| 28 | 60 | 97 | 4.6 | 3.0 | 47 | 64 | 94 |
| 29 | 60 | 123 | 3.6 | 3.3 | 39 | 79 | 94 |
| 30 | 61 | 60 | 7.6 | 4.5 | 64 | 71 | 95 |
| 31 | 61 | 100 | 4.5 | 0.38 | 34 | 6.8 | 79 |

The best results were obtained with the highest air-water ratio (7.6). For treating chloroform-laden water, a stripper operating at a higher air:water ratio would be better.

Example 9

The apparatus of Example 1 was used in closed mode to measure the removal of carbon tetrachloride (TETRA) from water. Air was used as the stripping gas. In this case, very high concentrations of TETRA in water were used compared with the earlier experiments. Air flow rates through the stripper of 64 and 66 scfm were used. Water flow rates of 11 and 60 gpm were used, giving air:water volume ratios of 8.0 and 50. The concentration of organic compound in the water was 168 ppmw and 500 ppmw. The concentration of organic compound in the exhaust air from the stripper was 2,580 ppmv and 1,350 ppmv. The results are listed in Table 7.

TABLE 7

| | Performance Data of Combined Stripper/Membrane Separation System Operating with High Concentrations of Carbon Tetrachloride (TETRA). | | | | | | |
| --- | --- | --- | --- | --- | --- | --- | --- |
| Exp. No. | Air flow rate (scfm) | Water flow rate (gpm) | A/W volume ratio (—) | Water Inlet conc. (ppmw) | Removal by Stripper (%) | Air Outlet conc. (ppmv) | Removal by Membrane (%) |
| 32 | 64 | 60 | 8.0 | 168 | 17 | 2,580 | 90 |
| 33 | 66 | 11 | 50 | 500 | 93 | 1,350 | 94 |

Very good removal was obtained at the higher air:water volume ratio.

Example 10

The apparatus of Example 1 was used in closed mode to measure the removal of mixtures of TCE, TETRA and chloroform from water. Air was used as the stripping gas. Air flow rates through the stripper of 57–70 scfm were used. Water flow rates of 59–123 gpm were used, giving air:water volume ratios of 3.5 to 7.2. The total organic concentration in the water was varied from 1.0 ppmw to 6.3 ppmw. The total organic concentration in the exhaust air from the stripper varied from 31.7 ppmv to 162 ppmv. The results are listed in Table 8.

TABLE 8

| | Performance Data of Combined Stripper/Membrane Separation System Operating with Mixed Organics in Water | | | | | | |
| --- | --- | --- | --- | --- | --- | --- | --- |
| Exp. No. | Air Flow Rate (scfm) | Water Flow Rate (gpm) | A/W Volume Ratio (—) | Water Inlet Conc. (ppmw) | Removal by Stripper (%) | Air Outlet Conc. (ppmv) | Removal by Membrane (%) |
| 34 | 60 | 100 | 4.5 | 0.62 CHCl$_3$ | 24 | 16 CHCl$_3$ | 89 |
|  |  |  |  | 0.14 CCl$_4$ | 83 | 6.3 CCl$_4$ | 92 |
|  |  |  |  | 0.26 TCE | 58 | 9.4 TCE | 95 |
|  |  |  |  | 1.02 Total | 41 | 31.7 Total | 91 |
| 35 | 60 | 100 | 4.5 | 2.23 CHCl$_3$ | 36 | 46 CHCl$_3$ | 92 |
|  |  |  |  | 0.85 CCl$_4$ | 86 | 30 CCl$_4$ | 92 |
|  |  |  |  | 1.46 TCE | 64 | 43 TCE | 92 |
|  |  |  |  | 4.54 Total | 60 | 119 Total | 92 |
| 36 | 57 | 123 | 3.5 | 3.44 CHCl$_3$ | 33 | 62 CHCl$_3$ | 94 |
|  |  |  |  | 1.04 CCl$_4$ | 83 | 42 CCl$_4$ | 94 |
|  |  |  |  | 1.84 TCE | 60 | 58 TCE | 93 |
|  |  |  |  | 6.32 Total | 49 | 162 Total | 94 |
| 37 | 57 | 59 | 7.2 | 2.19 CHCl$_3$ | 63 | 35 CHCl$_3$ | 94 |

TABLE 8-continued

Performance Data of Combined Stripper/Membrane Separation System Operating with Mixed Organics in Water

| Exp. No. | Air Flow Rate (scfm) | Water Flow Rate (gpm) | A/W Volume Ratio (—) | Water Inlet Conc. (ppmw) | Removal by Stripper (%) | Air Outlet Conc. (ppmv) | Removal by Membrane (%) |
|---|---|---|---|---|---|---|---|
| | | | | 1.17 CCl₄ | 97 | 23 CCl₄ | 94 |
| | | | | 1.78 TCE | 88 | 34 TCE | 94 |
| | | | | 5.14 Total | 79 | 92 Total | 94 |

Overall organic compound removal from the water varied from about 40% to 80%. TETRA was removed best, chloroform worst. The best result was achieved with the highest air:water volume ratio.

Example 11

An experiment similar to those of Example 10, but using nitrogen as the stripping gas, was performed. The nitrogen flow was 70 scfm and the water flow rate was 100 gpm, giving an air:water volume ratio of 5.2. The total organic concentration in the water was 5.6 ppmw. The total organic concentration in the exhaust air from the stripper was 114 ppmv. The results are listed in Table 9.

TABLE 9

Performance Data of Combined Nitrogen Stripper/Mmebrane Separation System Operating with Mixed Organics in Water.

| Nitrogen Flow Rate (scfm) | Water Flow Rate (gpm) | N/W Volume Ratio (—) | Water Inlet Conc. (ppmw) | Removal by Stripper (%) | Nitrogen Outlet Conc. (ppmv) | Removal by Membrane (%) |
|---|---|---|---|---|---|---|
| 70 | 100 | 5.2 | 2.70 CHCl4 | 36 | 43 CHCl₃ | 90 |
| | | | 1.13 CCl4 | 80 | 30 CCl₄ | 90 |
| | | | 1.76 TCE | 54 | 41 TCE | 89 |
| | | | 5.59 Total | 50 | 114 Total | 90 |

Overall organic compound removal from the water was 50%, with TETRA being the best removed and chloroform the worst removed.

Example 12

Computer Model

A computer program that models the performance of a gas stripper combined with a multistage membrane system was developed.

The membrane segment of the program was designed to accept feed streams that consist of two condensable vapors and up to eight noncondensable gases. The program yields the required membrane area and the residue and permeate stream characteristics that will be achieved based on feed stream characteristics and system operating parameters that are input by the operator. The performance of the condensers in the system can be calculated for three different options: (1) using Raoult's law (the two condensables form ideal mixtures), (2) using the van Laar equation of state (the two condensables form non-ideal mixtures), and (3) assuming the two condensables are completely immiscible.

The gas stripper segment of the program was based on software models available in the open literature adapted to the stripper/membrane unit combinations of the invention. In particular, the model was designed to allow for situations where the stripping gas is recirculated so that the organic compound concentration in the inlet stripping gas is not necessarily zero. The program can be used in two different ways: (1) to design a stripper, based on a specified percentage of organic compound removal and specified operating conditions, such as stripping gas and water flow rates and stripper packing material, and (2) to calculate the organic compound removal by a specific stripper, based on operating conditions selected by the user of the program.

Examples 13-16

The computer model that was developed in Example 12 was used to evaluate how a stripper/membrane unit apparatus is expected to react to changes in operating conditions. TCE was used as the model organic compound for all the calculations and air was chosen as the stripping gas. The base-case conditions used in the calculations in all four examples are given below. The tower parameters are those of the apparatus constructed in Example 1.

Air inlet flow rate: 75 scfm
Air-to-water volume ratio: 5:1
Water-inlet TCE concentration: 5 ppm
Air-Inlet TCE concentration: 0 ppm
Water temperature: 20° C.
Packing height: 10 ft
Stripper diameter: 3 ft
Packing: Tri-Packs #½

Example 13

The computer model was used to examine the effect of changes in the air:water volume ratio on TCE removal by the stripper. TCE removal is quantified by a TCE reduction factor, i.e. the water-inlet TCE concentration divided by the water-outlet TCE concentration. The TCE concentration reduction factor in the water as a function of the air:water volume ratio is shown in FIG. 15.

Figure 15:
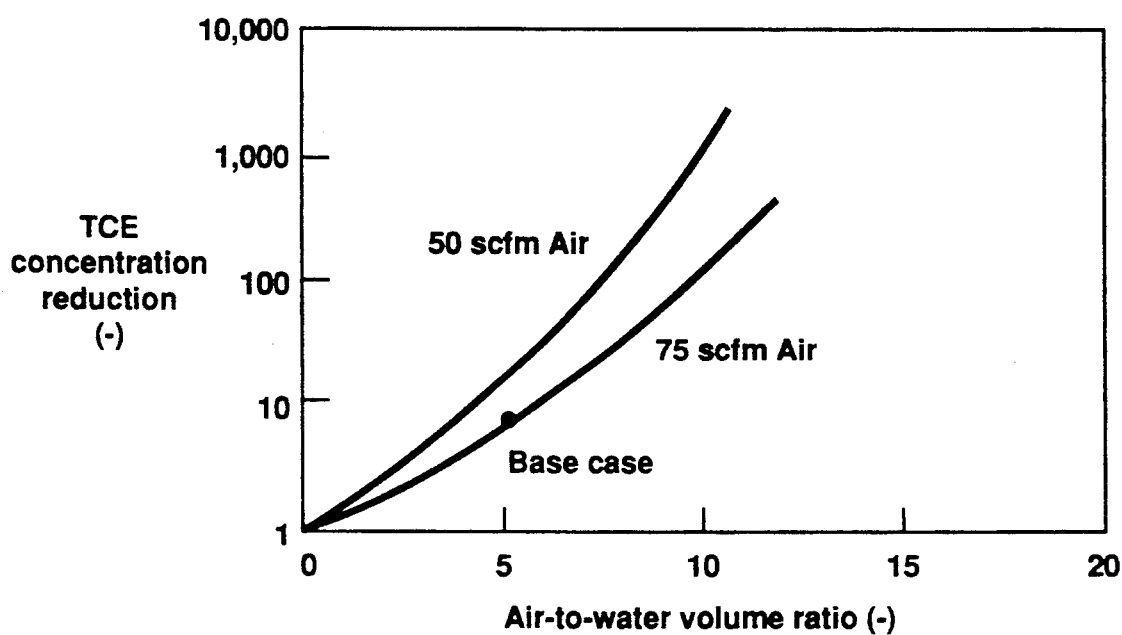
FIG. 15 is a graph showing TCE removal as a function of air:water volume ratio as calculated from a computer model.

FIG. 15 shows that increasing the air:water volume ratio improves TCE removal, because the TCE concentration in the air is lowered. As a result, the driving force for TCE removal is increased. FIG. 15 also shows that reducing the air flow rate at a constant air-to-water ratio improves TCE removal because the residence times of both water and air in the air stripper increase. This leads to increased contact time between the air and water phases.

Example 14

The computer model was used to examine the effect of changes in the water-inlet TCE concentration on TCE removal by the stripper. TCE removal is quantified by a TCE reduction factor, i.e. the water-inlet TCE concentration divided by the water-outlet TCE concentration. The TCE concentration reduction factor in the water as a function of the water-inlet TCE concentration is shown in FIG. 16.

Figure 16:
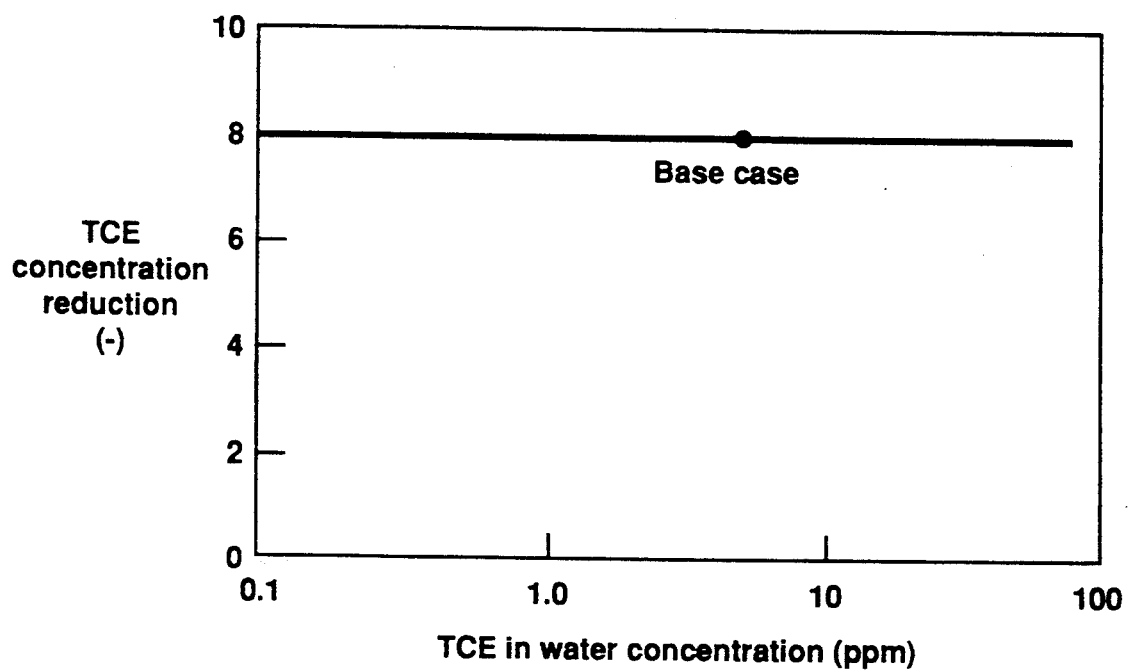
FIG. 16 is a graph showing TCE removal as a function of the TCE concentration in the incoming water as calculated from a computer model.

FIG. 16 shows that TCE removal is independent of the water-inlet TCE concentration.

Example 15

The computer model was used to examine the effect of changes in the water temperature on TCE removal by the stripper. TCE removal is quantified by a TCE reduction factor, i.e. the water-inlet TCE concentration divided by the water-outlet TCE concentration. The TCE concentration reduction factor in the water as a function of the water temperature is shown in FIG. 17.

Figure 17:
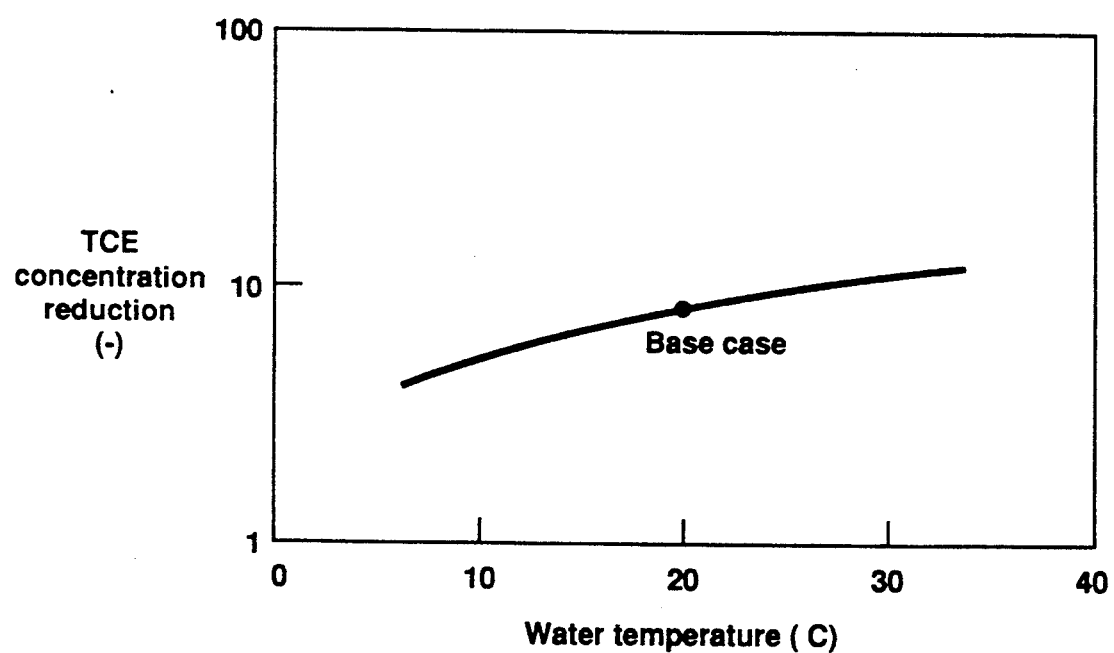
FIG. 17 is a graph showing TCE removal as a function of water temperature as calculated from a computer model.

FIG. 17 shows that TCE removal is improved by increasing the water temperature. The increased volatility of TCE (and other organic liquids) at higher temperatures is responsible for this behavior.

Example 16

The computer model was used to examine the effect of changes in the air-inlet TCE concentration on TCE removal by the stripper. TCE removal is quantified by a TCE reduction factor, i.e. the water-inlet TCE concentration divided by the water-outlet TCE concentration. The TCE concentration reduction factor in the water as a function of the air-inlet TCE concentration is shown in FIG. 18.

Figure 18:
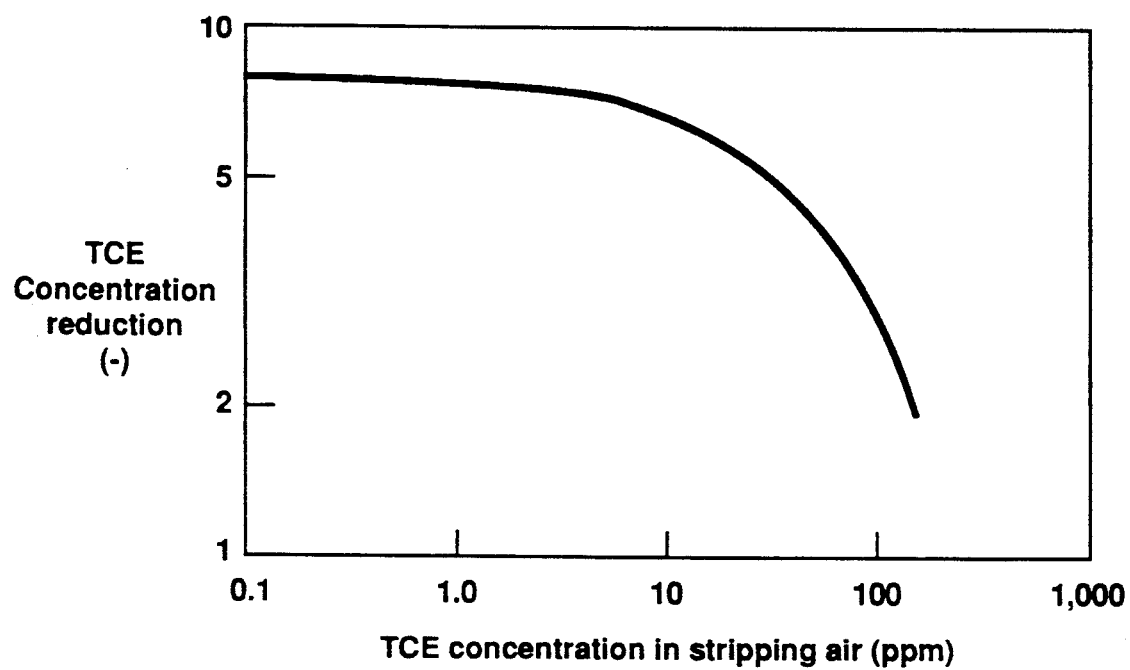
FIG. 18 is a graph showing TCE removal as a function of the TCE concentration in the stripping gas calculated from a computer model.

FIG. 18 shows that surprisingly large amounts of TCE can be tolerated before the TCE removal is seriously reduced. The reduction in TCE removal is caused by a decrease in driving force for the TCE-stripping process.

We claim:

1. A process for removing an organic compound from water, comprising:
   (a) introducing a flow of water to a gas-stripping step adapted to contact gas and water, thereby causing stripping of said organic compound from said water by said gas and producing an organic-depleted water stream;
   (b) passing said gas to a membrane separation step, comprising:
      (i) providing a membrane having a feed side and a permeate side;
      (ii) contacting said feed side with said gas;
      (iii) withdrawing from said permeate side a permeate gas stream enriched in said organic compound compared with said gas;
      (iv) withdrawing from said feed side a residue gas stream depleted by at least about 80% in said organic compound compared with said gas;
   (c) reusing at least a part of said depleted gas stream as stripping gas in said gas-stripping step.

2. The process of claim 1, wherein said membrane is a composite membrane comprising a microporous support layer and a permselective coating layer.

3. The process of claim 1, wherein said membrane comprises a rubbery polymer.

4. The process of claim 1, wherein said membrane comprises a glassy polymer.

5. The process of claim 1, wherein said membrane comprises silicone rubber.

6. The process of claim 1, wherein said membrane comprises PTMSP.

7. The process of claim 1, wherein said membrane comprises a polymer of perfluorodimethyldioxole.

8. The process of claim 1, wherein said organic compound comprises a hydrocarbon.

9. The process of claim 1, wherein said organic compound comprises a chlorinated hydrocarbon.

10. The process of claim 1, wherein said organic compound is selected from the group consisting of trichloroethylene, perchloroethylene and carbon tetrachloride.

11. The process of claim 1, wherein said membrane separation step includes providing a partial vacuum on the permeate side of the membrane.

12. The process of claim 1, wherein said membrane separation step includes compressing said gas above atmospheric pressure prior to bringing it into contact with said feed side.

13. The process of claim 1, wherein said membrane separation step is accomplished using one membrane stage.

14. The process of claim 1, wherein said membrane separation step is accomplished using multiple membrane stages.

15. The process of claim 1, further comprising:
   (d) subjecting said enriched gas stream to a condensation step to recover said organic compound in liquid form.

16. The process of claim 1, wherein said gas comprises air.

17. The process of claim 1, wherein said gas comprises nitrogen.

18. The process of claim 1, wherein said organic compound concentration in said water is less than 100 ppmw.

19. The process of claim 1, wherein said organic compound concentration in said water is more than 100 ppmw.

20. The process of claim 1, wherein said process achieves at least 60% organic compound removal from said water.

21. The process of claim 1, wherein said process achieves at least 90% organic compound removal from said water.

22. The process of claim 1, wherein said membrane separation step achieves at least 90% organic compound removal from said gas.

23. The process of claim 1, wherein the gas:water volume ratio in said stripping step is less than about 50:1.

24. The process of claim 1, wherein the gas:water volume ratio in said stripping step is less than about 10:1.

25. The process of claim 1, further comprising heating said water prior to said gas-stripping step.

26. The process of claim 1, wherein said flow of water is run in heat-exchanging relationship with said enriched gas stream.

27. The process of claim 1, wherein said flow of water is run in heat-exchanging relationship with said gas before said gas enters said membrane separation step.

28. The process of claim 1, further comprising filtering said water prior to said gas-stripping step.

29. The process of claim 1, wherein said gas comprises steam and wherein said steam is at least partially condensed after said gas-stripping step and before said membrane separation step.

30. A process for removing an organic compound from water, comprising:
   (a) introducing a flow of water to a first gas-stripping step adapted to contact gas and water, thereby causing stripping of said organic compound from said water by said gas and producing a partially organic-depleted water stream;

(b) passing said gas to a membrane separation step, comprising:
  (i) providing a membrane having a feed side and a permeate side;
  (ii) contacting said feed side with said gas;
  (iii) withdrawing from said membrane an enriched gas stream enriched in said organic compound compared with said gas;
  (iv) withdrawing from said membrane a depleted gas stream depleted in said organic compound compared with said gas;

(c) passing said partially organic-depleted water stream to a second gas-stripping step.

31. The process of claim 30, wherein the gas:water volume ratio in said first stripping step is less than about 50:1.

32. The process of claim 30, wherein the gas:water volume ratio in said first stripping step is less than about 10:1.

33. The process of claim 30, wherein the gas:water volume ratio in said second stripping step is greater than about 10:1.

34. The process of claim 30, wherein the gas:water volume ratio in said second stripping step is greater than about 50:1.

35. The process of claim 30, wherein the gas:water volume ratio in said first and second gas stripping steps is substantially different.

36. The process of claim 30, wherein said enriched gas stream is a permeate gas stream.

37. The process of claim 30, wherein said enriched gas stream is a residue gas stream.

38. The process of claim 30, wherein said step (c) comprises passing said partially organic-depleted water stream to a second treatment step that is not a gas-stripping step.

39. The process of claim 38, wherein said second treatment step is selected from the group consisting of adsorption, absorption, catalytic incineration, chemical destruction, ozonation and biological treatment.

40. The process of claim 30, wherein said gas comprises steam and wherein said steam is at least partially condensed after said first gas-stripping step and before said membrane separation step.

41. A process for removing an organic compound from water, comprising:

(a) introducing a flow of water to gas-stripping step adapted to contact gas and water in a gas:water volume ratio less than about 50:1, thereby causing stripping of said organic compound from said water by said gas and producing an organic-depleted water stream;

(b) passing said gas to a membrane separation step, comprising:
  (i) providing a membrane having a feed side and a permeate side;
  (ii) contacting said feed side with said gas;
  (iii) withdrawing from said membrane an enriched gas stream enriched in said organic compound compared with said gas;
  (iv) withdrawing from said membrane a depleted gas stream substantially depleted in said organic compound compared with said gas.

42. The process of claim 41, wherein said gas:water volume ratio is less than about 20:1.

43. The process of claim 41, wherein said gas:water volume ratio is less than about 10:1.

44. The process of claim 41, wherein said enriched gas stream is a permeate gas stream.

45. The process of claim 41, wherein said enriched gas stream is a residue gas stream.

46. The process of claim 41, wherein said gas comprises steam and wherein said steam is at least partially condensed after said gas-stripping step and before said membrane separation step.

47. A process for removing an organic compound from water, comprising:

(a) introducing a flow of water and a flow of gas, said gas being at subatmospheric pressure, to a gas-stripping step adapted to contact said gas and water, thereby causing stripping of said organic compound from said water by said gas and producing an organic-depleted water stream;

(b) passing said gas to a membrane separation step, comprising:
  (i) providing a membrane having a feed side and a permeate side;
  (ii) contacting said feed side with said gas;
  (iii) withdrawing from said permeate side a permeate gas stream enriched in said organic compound compared with said gas;
  (iv) withdrawing from said feed side a residue gas stream depleted by at least about 80% in said organic compound compared with said gas.

48. The process of claim 47, wherein said subatmospheric pressure is less than about 0.5 atm.

49. The process of claim 47, wherein said subatmospheric pressure is achieved by passing said gas through a vacuum pump between said gas-stripping step and said membrane separation step.

50. The process of claim 49, wherein said membrane separation step is driven by connecting said permeate side to the low-pressure side of said vacuum pump.

51. The process of claim 47, wherein said gas comprises steam and wherein said steam is at least partially condensed after said gas-stripping step and before said membrane separation step.

52. A process for removing an organic compound from water, comprising:

(a) introducing a flow of water to a gas-stripping step adapted to countercurrently contact gas and water, thereby causing stripping of said organic compound from said water by by said gas and producing an organic-depleted water stream;

(b) passing said gas to a first membrane separation step, comprising:
  (i) providing a first membrane having a first feed side and a first permeate side;
  (ii) contacting said first feed side with said gas;
  (iii) withdrawing from said first permeate side a first permeate gas stream enriched in said organic compound compared with said gas;
  (iv) withdrawing from said first feed side a first residue gas stream substantially depleted in said organic compound compared with said gas;
  (v) providing a second membrane having a second feed side and a second permeate side;
  (vi) contacting said second feed side with said first permeate gas stream;
  (vii) withdrawing from said second permeate side a second permeate gas stream enriched in said organic compound compared with said first permeate gas stream;

(viii) withdrawing from said second feed side a second residue gas stream depleted in said organic compound compared with said first permeate gas stream;

(c) reusing at least a part of said first residue gas stream as stripping gas in said gas-stripping step.

53. The process of claim 52, wherein said second residue stream is returned to the first feed side of said first membrane.

54. The process of claim 52, further comprising:
(d) subjecting said second permeate gas stream to a condensation step to recover said organic compound in liquid form.

55. The process of claim 54, wherein any noncondensed gas from said condensation step is returned to said second feed side of said second membrane.

56. The process of claim 52, wherein said gas comprises steam and wherein said steam is at least partially condensed after said gas-stripping step and before said first membrane separation step.

57. A process for removing an organic compound from water, comprising:
(a) introducing a flow of water to a gas-stripping step adapted to countercurrently contact gas and water, thereby causing stripping of said organic compound from said water by said gas and producing an organic-depleted water stream;
(b) passing said gas to a first membrane separation step, comprising:
(i) providing a first membrane having a first feed side and a first permeate side;
(ii) contacting said first feed side with said gas;
(iii) withdrawing from said first permeate side a first permeate gas stream enriched in said organic compound compared with said gas;
(iv) withdrawing from said first feed side a first residue gas stream substantially depleted in said organic compound compared with said gas;
(v) providing a second membrane having a second feed side and a second permeate side;
(vi) contacting said second feed side with said first permeate gas stream;
(vii) withdrawing from said second permeate side a second permeate gas stream enriched in said organic compound compared with said first permeate gas stream;
(viii) withdrawing from said second feed side a second residue gas stream depleted in said organic compound compared with said first permeate gas stream;
(ix) providing a third membrane having a third feed side and a third permeate side;
(x) contacting said third feed side with said second permeate gas stream;
(xi) withdrawing from said third permeate side a third permeate gas stream enriched in said organic compound compared with said second permeate gas stream;
(xii) withdrawing from said third feed side a third residue gas stream depleted in said organic compound compared with said second permeate gas stream;
(c) reusing at least a part of said first residue gas stream as stripping gas in said gas-stripping step.

58. The process of claim 57, wherein said second residue stream is returned to the first feed side of said first membrane.

59. The process of claim 57, wherein said third residue stream is returned to the second feed side of said second membrane.

60. The process of claim 57, further comprising:
(d) subjecting said third permeate gas stream to a condensation step to recover said organic compound in liquid form.

61. The process of claim 60, wherein any noncondensed gas from said condensation step is returned to said third feed side of said third membrane.

62. The process of claim 57, wherein said gas comprises stream and wherein said stream is at least partially condensed after said gas-stripping step and before said first membrane separation step.

63. A process for removing an organic compound from water, comprising:
(a) introducing a flow of water to a gas-stripping step adapted to contact gas and water, thereby causing stripping of said organic compound from said water by said gas and producing an organic-depleted water stream;
(b) compressing said gas;
(c) subjecting said gas to a condensation step to recover said organic compound in liquid form;
(d) passing noncondensed gas from said condensation step to a membrane separation step, comprising:
(i) providing a membrane having a feed side and a permeate side;
(ii) contacting said feed side with said gas;
(iii) withdrawing from said permeate side a permeate gas stream enriched in said organic compound compared with said gas;
(iv) withdrawing from said feed side a residue gas stream substantially depleted in said organic compound compared with said gas;
(e) returning said permeate gas stream upstream of said compressing (b) and condensation step (c);
(f) reusing at least a part of said residue gas stream as stripping gas in said gas-stripping step.

64. The process of claim 63, wherein said gas comprises steam and wherein said steam is at least partially condensed after said gas-stripping step and before said membrane separation step.

65. A process for removing an organic compound from water, comprising:
(a) introducing a flow of water to a gas-stripping step adapted to countercurrently contact gas and water, thereby causing stripping of said organic compound from said water by said gas and producing an organic-depleted water stream;
(b) passing said gas to a first membrane separation step, comprising:
(i) providing a first membrane having a first feed side and a first permeate side;
(ii) contacting said first feed side with said gas;
(iii) withdrawing from said first permeate side a first permeate gas stream enriched in said organic compound compared with said gas;
(iv) withdrawing from said first feed side a first residue gas stream substantially depleted in said organic compound compared with said gas;
(v) providing a second membrane having a second feed side and a second permeate side;
(vi) contacting said second feed side with said first residue gas stream;
(vii) withdrawing from said second permeate side a second permeate gas stream enriched in said organic compound compared with said first residue gas stream;
(viii) withdrawing from said second feed side a second residue gas stream depleted in said organic compound compared with said first residue gas stream;
(c) subjecting said first permeate gas stream to a condensation step to recover said organic compound in liquid form.

66. The process of claim 65 wherein said second permeate stream is returned to the first feed side of said first membrane.

67. The process of claim 65, wherein any noncondensed gas from said condensation step is returned to said first feed side of said first membrane.

68. The process of claim 65, wherein said gas comprises steam and wherein said steam is at least partially condensed after said gas-stripping step and before said first membrane separation step.

69. A process for removing an organic compound from water, comprising:
(a) introducing a flow of water to a gas-stripping step adapted to contact gas and water, thereby causing stripping of said organic compound from said water by said gas and producing an organic-depleted water stream;
(b) passing said gas to a membrane separation step, comprising:
(i) providing a membrane having a feed side and a permeate side;
(ii) contacting said feed side with said gas;
(iii) withdrawing from said permeate side a permeate gas stream enriched in said organic compound compared with said gas;
(iv) withdrawing from said feed side a residue gas stream substantially depleted in said organic compound compared with said gas;
(c) subjecting said permeate gas stream to a condensation step to recover said organic compound in liquid form.

70. The process of claim 69, wherein any noncondensed gas from said condensation step is returned to said feed side of said membrane.

71. The process of claim 69, wherein said membrane comprises silicone rubber.

72. The process of claim 69, wherein said membrane comprises PTMSP.

73. The process of claim 69, wherein said membrane comprises a polymer of perfluorodimethyldioxole.

74. The process of claim 69, wherein said organic compound comprises a hydrocarbon.

75. The process of claim 69, wherein said organic compound comprises a chlorinated hydrocarbon.

76. The process of claim 69, wherein said membrane separation step includes providing a partial vacuum on the permeate side of the membrane.

77. The process of claim 69, wherein said membrane separation step includes compressing said gas above atmospheric pressure prior to bringing it into contact with said feed side.

78. The process of claim 69, wherein said membrane separation step is accomplished using one membrane stage.

79. The process of claim 69, wherein said membrane separation step is accomplished using multiple membrane stages.

80. The process of claim 69, wherein said gas comprises air.

81. The process of claim 69, wherein said gas comprises nitrogen.

82. The process of claim 69, further comprising heating said water prior to said gas-stripping step.

83. The process of claim 69, further comprising:
(d) reusing at least a part of said residue gas stream as stripping gas in said gas-stripping step.

84. The process of claim 69, wherein said gas comprises steam and wherein said steam is at least partially condensed after said gas-stripping step and before said membrane separation step.

85. An apparatus, comprising:
(a) a gas-stripping unit having a water inlet, a water outlet, a gas inlet and a gas outlet;
(b) a membrane gas separation unit containing a membrane having a feed side and a permeate side, said membrane gas separation unit being connected in a gas-transferring loop with said gas-stripping unit such that gas can flow from said gas outlet to said feed side of said membrane gas separation unit and can flow from said feed side after treatment to said gas inlet;
(c) means for circulating gas in said gas-transferring loop;
(d) means for providing a driving force for gas separation in said membrane gas separation unit.

86. The apparatus of claim 85, further comprising:
(e) a condenser connected to said permeate side of said membrane gas separation unit.

87. The apparatus of claim 85, wherein said means for circulating gas comprises a pump.

88. The apparatus of claim 85, wherein said means for circulating gas comprises a blower.

89. The apparatus of claim 85, wherein said means for providing a driving force comprises a compressor connected between said gas outlet and said feed side.

90. The apparatus of claim 89, further comprising a condenser connected between said compressor and said feed side.

91. The apparatus of claim 85, wherein said means for providing a driving force comprises a vacuum pump connected between said permeate side and said condenser.

92. The apparatus of claim 85, wherein said membrane is a composite membrane comprising a microporous support layer and a thin permselective coating layer.

93. The apparatus of claim 85, wherein said membrane comprises a rubbery polymer.

94. The apparatus of claim 85, wherein said membrane is packaged in a spiral-wound membrane module.

95. The apparatus of claim 85, further comprising a second gas-stripping unit having a second water inlet, a second water outlet, a second gas inlet and a second gas outlet, said second water inlet being connected to said water outlet.

96. The apparatus of claim 85, wherein said membrane gas-separation unit comprises multiple membrane separation stages.

97. The apparatus of claim 85, further comprising a heater connected upstream of said water inlet.

98. The apparatus of claim 85, further comprising a heat exchanger having a gas side and a water side and positioned on said water side upstream of said water inlet, and on said gas side downstream of at least one of said means (c) and (d).

99. The apparatus of claim 85, wherein said means for circulating gas comprises a vacuum pump connected between said gas outlet and said feed side.

100. The apparatus of claim 99, wherein said means for providing a driving force is provided by connecting said permeate side to a low-pressure side of said vacuum pump.

101. The apparatus of claim 100, further comprising a condenser connected between said vacuum pump and said feed side.

102. The apparatus of claim 88, further comprising a filter connected upstream of said water inlet.

* * * * *